(12) United States Patent
Sato

(10) Patent No.: US 8,441,442 B2
(45) Date of Patent: May 14, 2013

(54) STORAGE MEDIUM WITH STORED CODE, METHOD, APPARATUS, AND/OR SYSTEM PROVIDING GESTURE RECOGNITION INCLUDING DETERMINATION OF USER INPUT MOVEMENT DIRECTION

(75) Inventor: Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1440 days.

(21) Appl. No.: 11/812,466

(22) Filed: Jun. 19, 2007

(65) Prior Publication Data

US 2008/0274813 A1 Nov. 6, 2008

(30) Foreign Application Priority Data

May 1, 2007 (JP) .................. 2007-121058

(51) Int. Cl.
*G06F 3/033* (2006.01)
(52) U.S. Cl.
USPC ............... 345/158; 345/159; 463/39; 463/43
(58) Field of Classification Search .................. 345/157, 345/158
See application file for complete search history.

(56) References Cited

U.S. PATENT DOCUMENTS

| | | | |
|---|---|---|---|
| 4,839,838 A | 6/1989 | LaBiche et al. | |
| 7,292,151 B2 * | 11/2007 | Ferguson et al. | 340/573.1 |
| 7,683,883 B2 * | 3/2010 | Touma et al. | 345/163 |
| 7,688,307 B1 * | 3/2010 | Tsyrganovich | 345/158 |

FOREIGN PATENT DOCUMENTS

| | | |
|---|---|---|
| EP | 1 206 950 | 5/2002 |
| JP | 2000-308756 | 11/2000 |
| JP | 2002-153673 | 5/2002 |

OTHER PUBLICATIONS

J. Brophy-Warren, "Magic Wand: How Hackers Make Use of Their Wii-motes", The Wall Street Journal Online, Apr. 28, 2007, 3 pages.
A. Rasmussen, "WiiBot: How to Build a sword-wielding, tennis-playing, WiiMote-controlled, friendly robot", Internet Article, Jan. 28, 2007, 6 pages, http://web.archive.org/web/20070128114537/http://www.usmechatronics.com/usmgarage/WiiBot.html.
C. Kenner, "GlovePIE 0.29 Documentation", Feb. 4, 2008, 79 pages, http://carl.kenner.googlepages.com/GlovePIE029.zip.
C. Kenner, GlovePIE 0.29 Home Page, Feb. 4, 2008, 2 pages, http://web.archive.org/web/20070204071015/http://carl.kenner.googlepages.com/glovepie.

* cited by examiner

*Primary Examiner* — Amare Mengistu
*Assistant Examiner* — Vinh Lam
(74) *Attorney, Agent, or Firm* — Nixon & Vanderhye P.C.

(57) ABSTRACT

An acceleration data acquisition means obtains acceleration data repeatedly. An acceleration determination means determines whether an acceleration represented by the acceleration data acquired by the acceleration data acquisition means is an acceleration at the time of accelerating, which is applied when a housing is moved and accelerated in a predetermined direction, or an acceleration at the time of decelerating, which is applied when the housing is moved and decelerated in the predetermined direction. A moving direction calculation means calculates a direction in which the housing is moved, by using the acceleration at the time of decelerating determined by the acceleration determination means. A processing means performs a predetermined process based on the moving direction calculated by using the moving direction calculation means.

26 Claims, 20 Drawing Sheets

F I G. 4
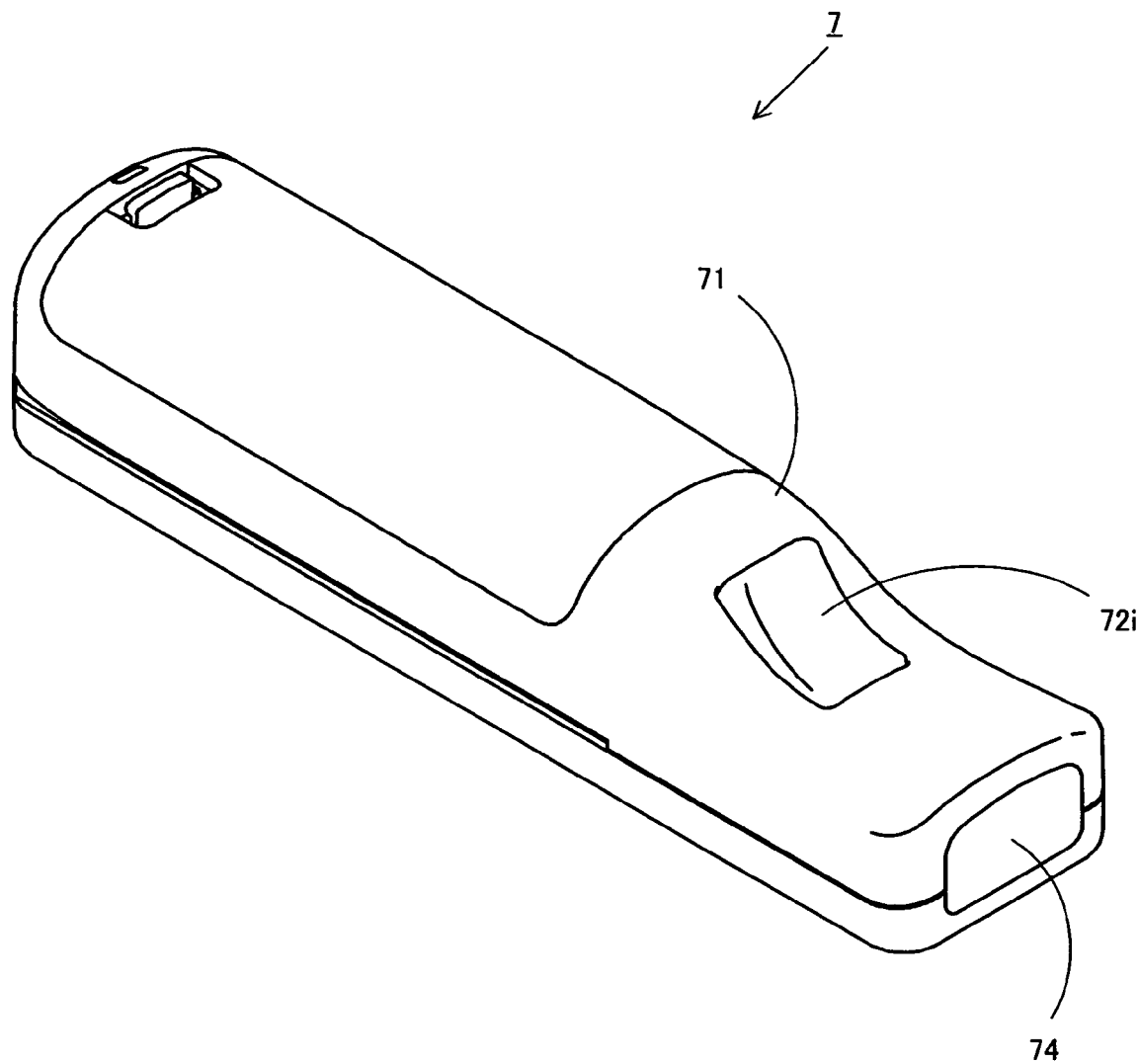

F I G. 7
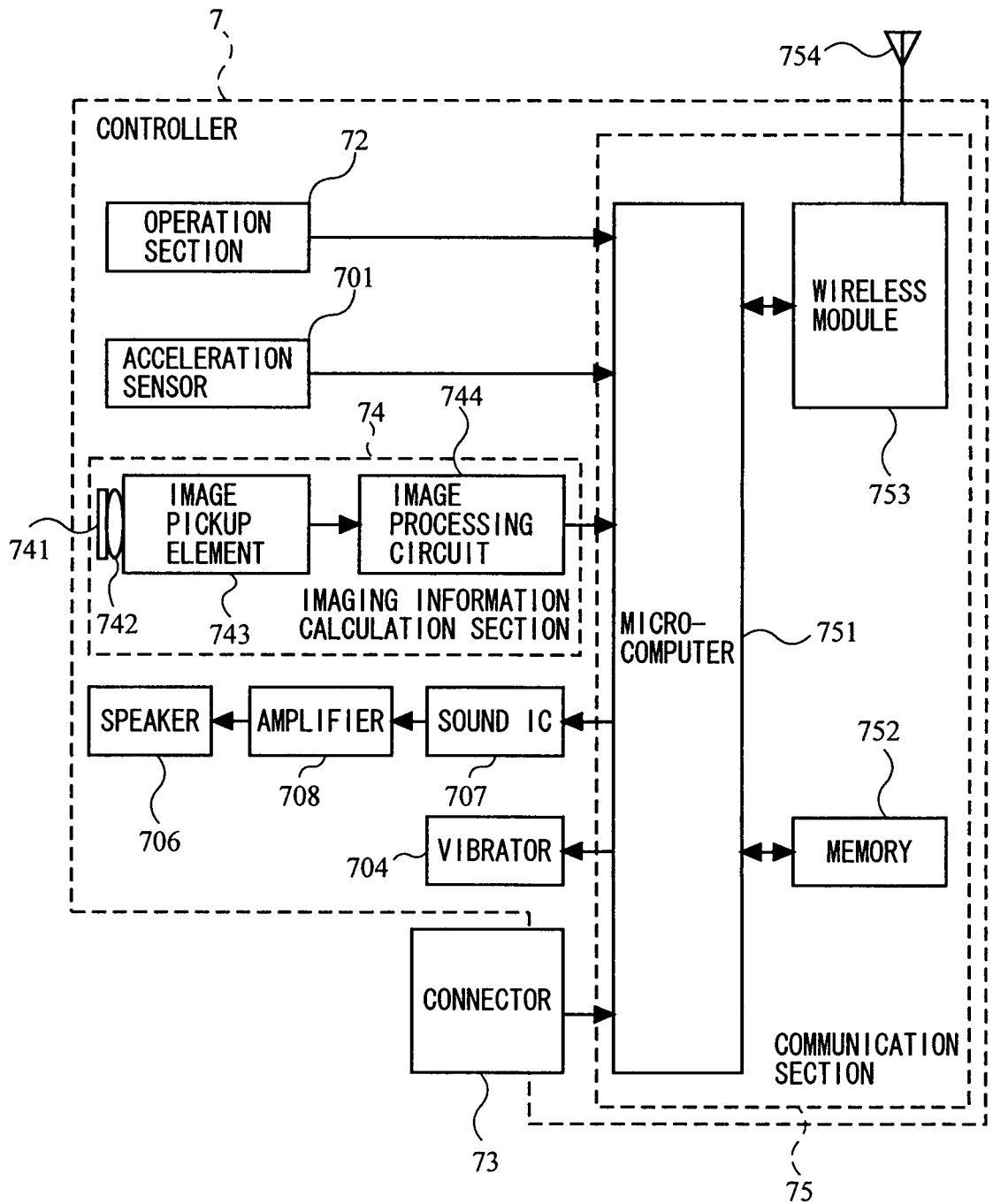

FIG. 8
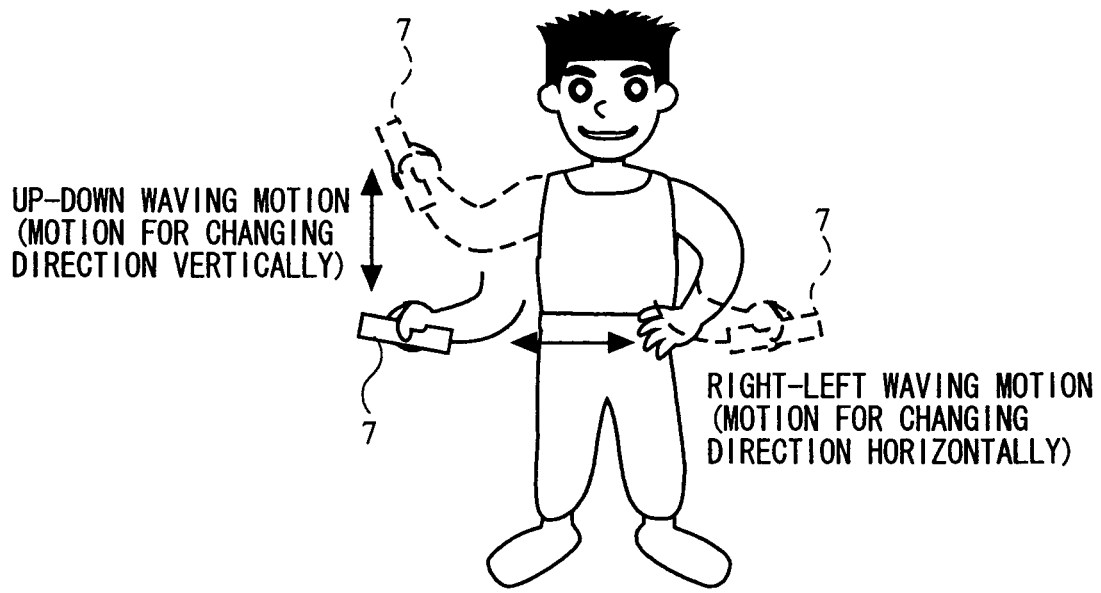
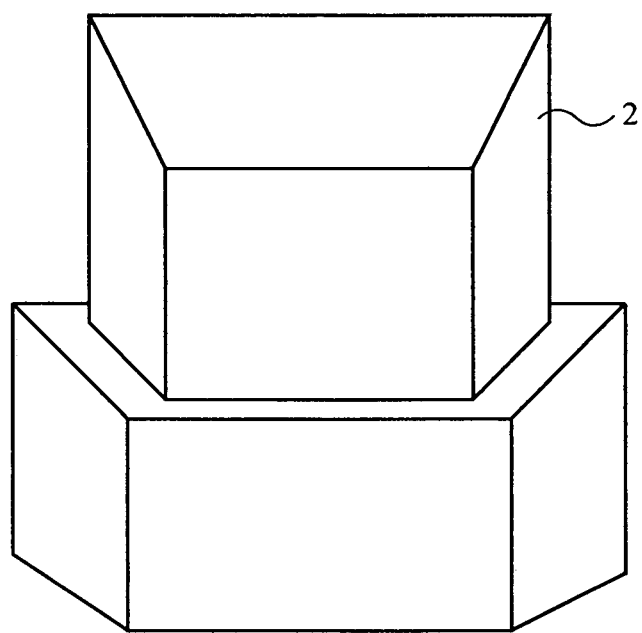

FIG. 9
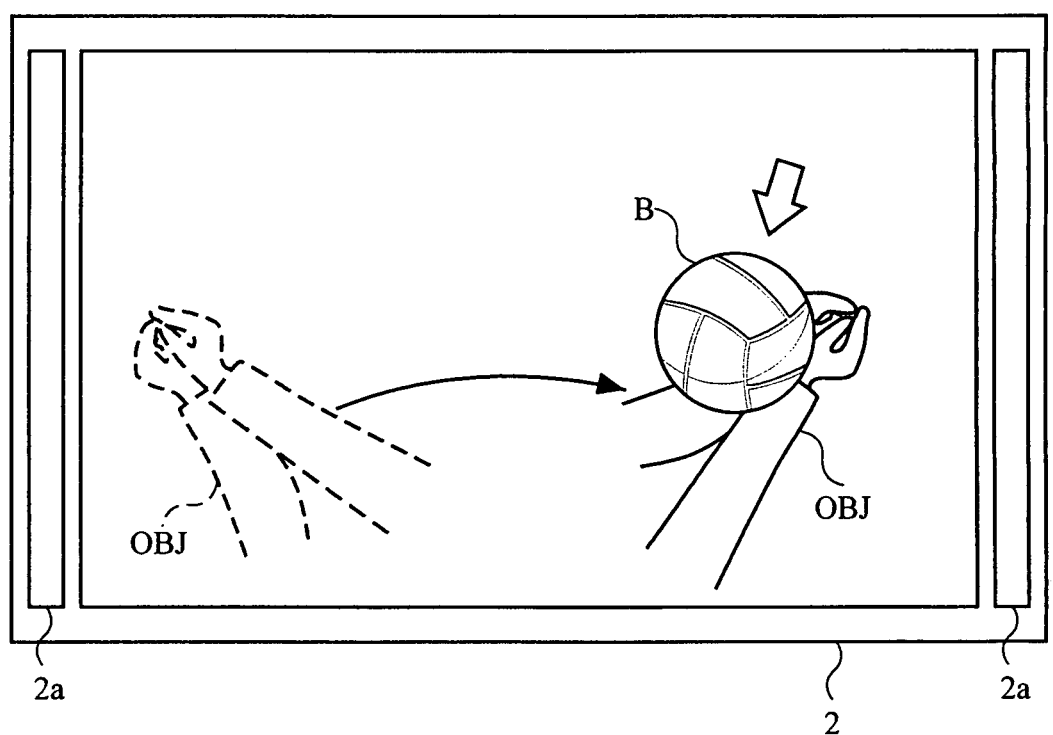
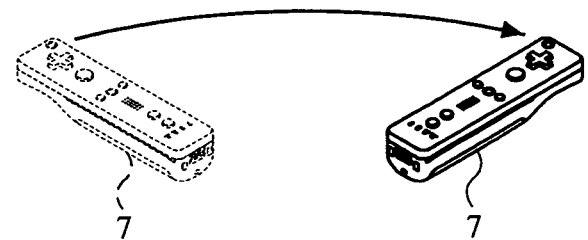

FIG. 10
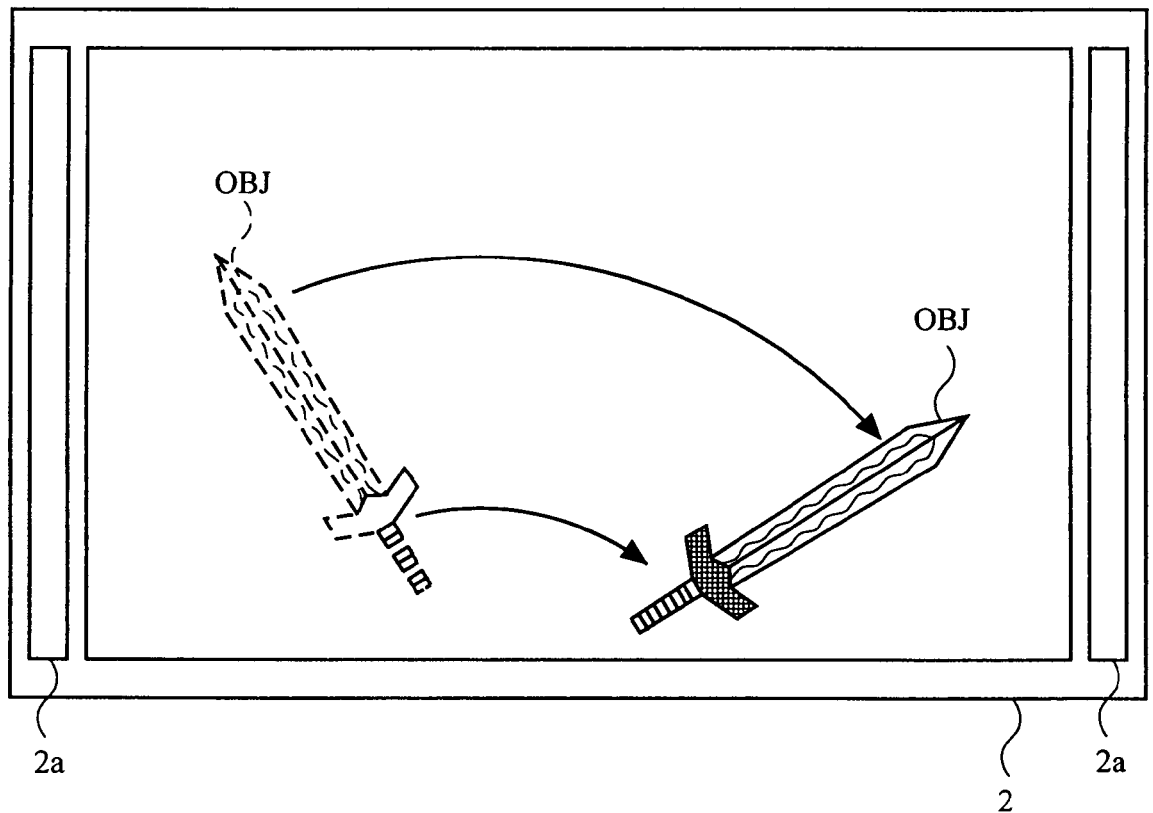
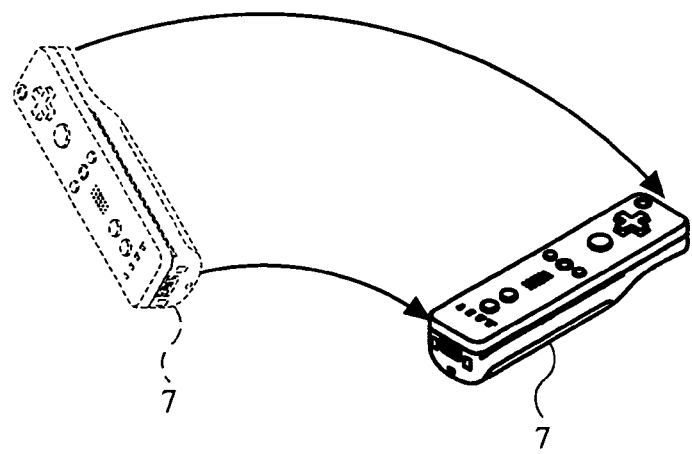

FIG. 12
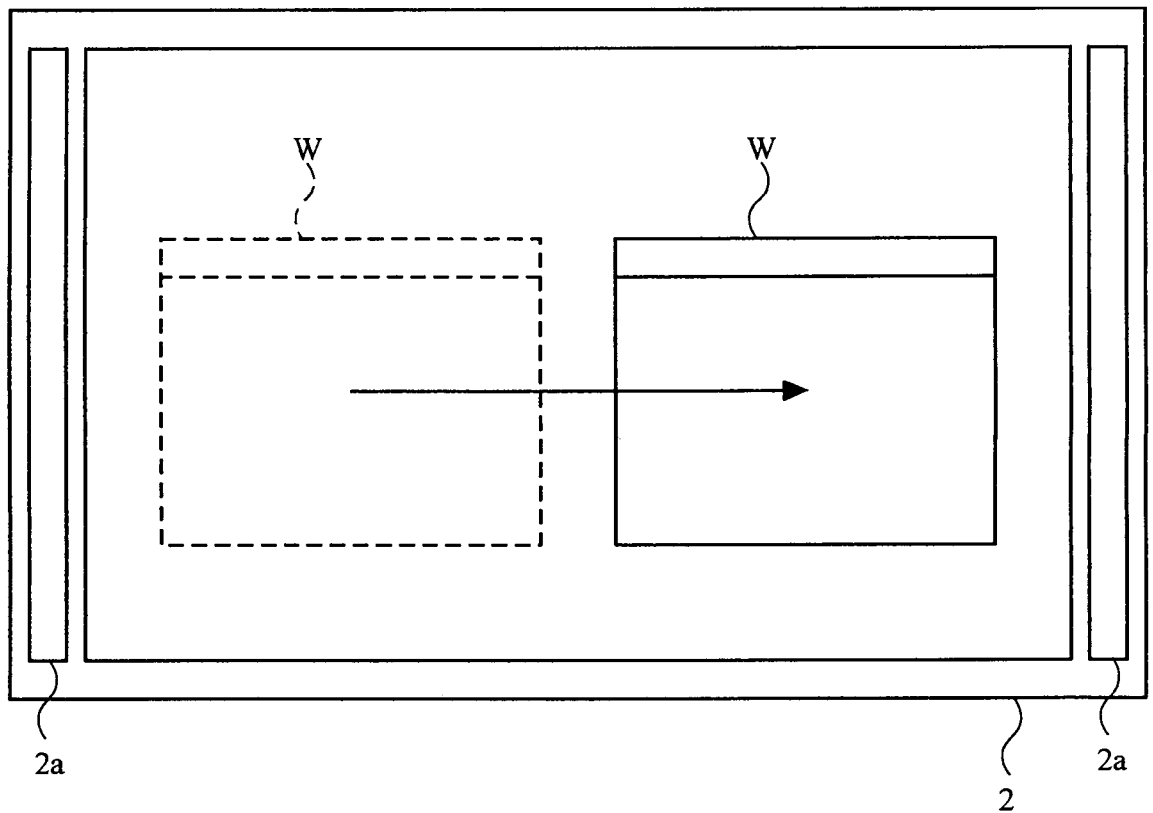
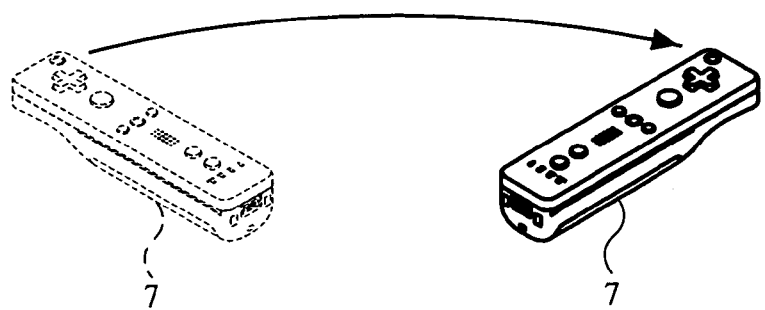

FIG. 13
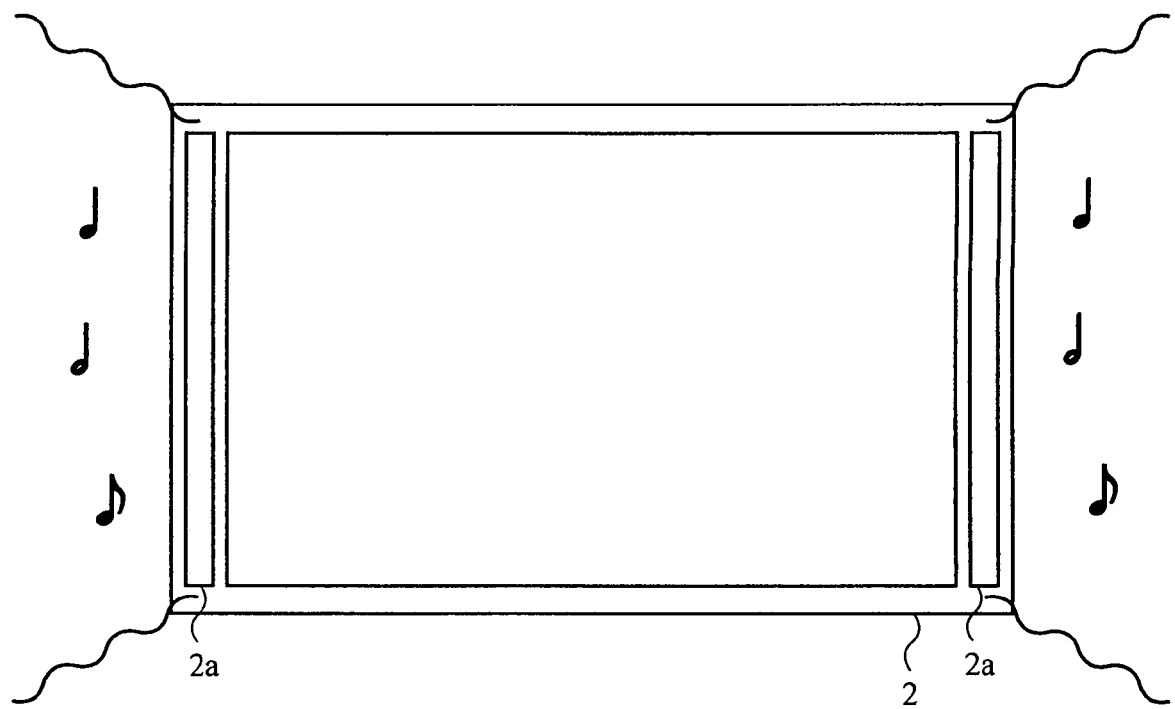
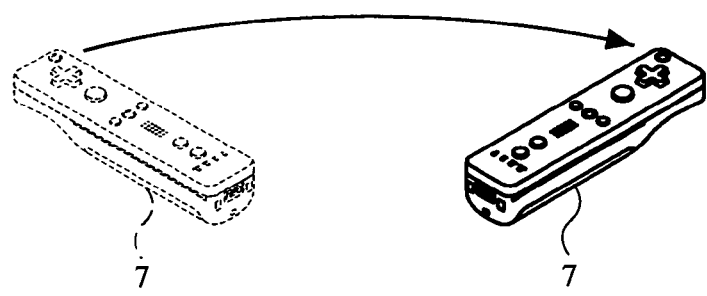

F I G. 1 9
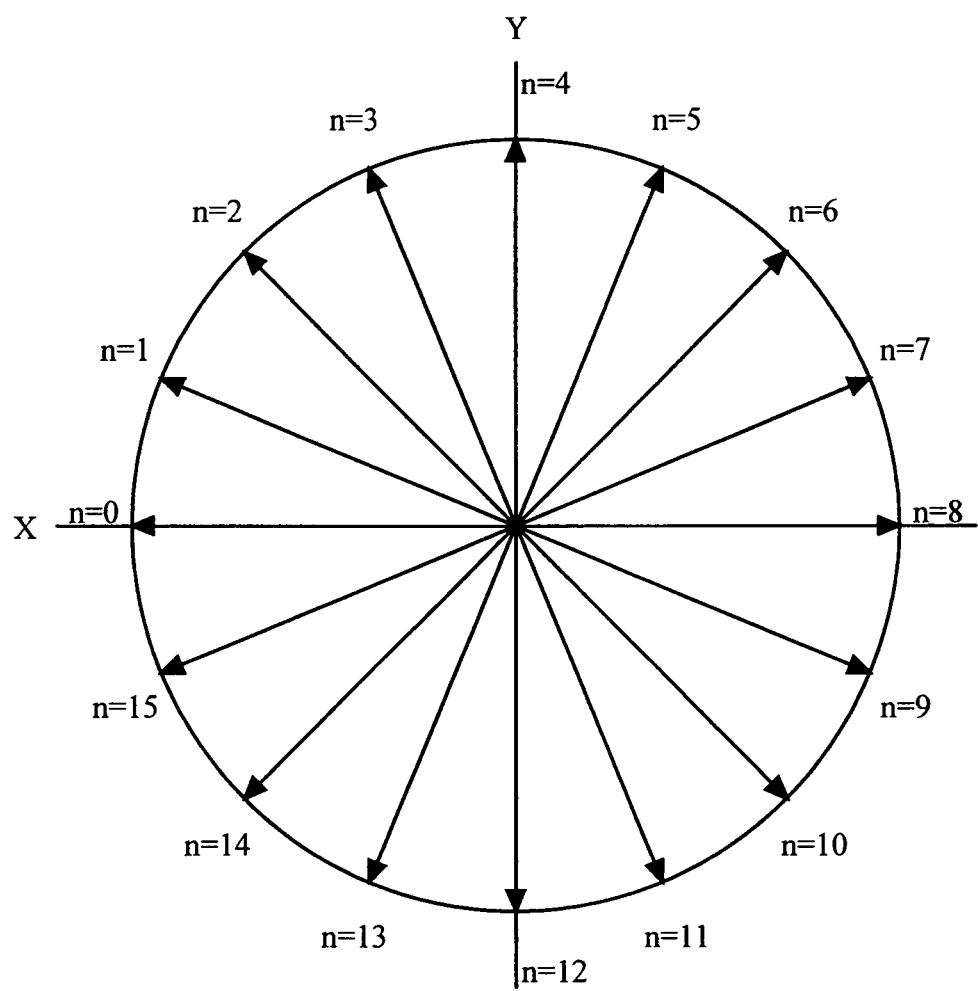

STORAGE MEDIUM WITH STORED CODE, METHOD, APPARATUS, AND/OR SYSTEM PROVIDING GESTURE RECOGNITION INCLUDING DETERMINATION OF USER INPUT MOVEMENT DIRECTION

CROSS REFERENCE TO RELATED APPLICATION

The disclosure of Japanese Patent Application No. 2007-121058, filed on May 1, 2007 is incorporated herein by reference.

FIELD

The technology herein relates to a storage medium having an information processing program stored thereon and an information processing apparatus, and more particularly to a storage medium having an information processing program stored thereon and an information processing apparatus, which are used for executing a process in accordance with data outputted by an acceleration sensor.

BACKGROUND AND SUMMARY

Conventionally, as disclosed in Japanese Laid-Open Patent Publication No. 2002-153673 (hereinafter referred to as Patent Document 1), for example, known is a game apparatus which calculates an action of a player throwing a punch, based on data outputted by an acceleration sensor, so as to allow the player to play a boxing game. The game apparatus disclosed in Patent Document 1 is structured such that a glove unit functioning as a controller of the game apparatus includes an acceleration sensor which detects an acceleration in three axial directions, that is, a front-rear (Y-axis) direction, a left-right (X-axis) direction, and an up-down (Z-axis) direction. The above-described apparatus analyzes an output waveform outputted by the acceleration sensor so as to identify a type of the punch thrown by the player. Specifically, the game apparatus calculates, based on an output waveform represented by the acceleration data detected in the Y-axis direction, a time period for a start of the punch thrown by the player to an end of the same punch. Next, the game apparatus uses output waveforms represented by the acceleration data in the X-axis direction and the acceleration data in the Z-axis direction, respectively, which are obtained in the time period from the start of the punch thrown by the player to the end of the same punch, so as to extract data representing, for example, a maximum value, a minimum value, amplitude, the number of times a peak appears, and an integration value. The game apparatus identifies the type of extracted data and a waveform pattern obtained for each of the types of the punches. After the identification of the type of the punch, the apparatus performs a game process in accordance with the type of the punch having been identified.

However, in accordance with a technique described in Patent document 1, since the game process in accordance with the type of the punch is performed after the player finished throwing the punch, and also after they type of the punch is determined, it is impossible to draw an image representing the punch thrown by the player. That is, in the technique according to Patent document 1, in the case where the image representing the punch thrown by the player, for example, such as an image in which a player character is throwing a punch, or an image in which an object indicating a fist of the player is moving is to be drawn, the image will only be displayed on a screen after the player finishes the punching motion. In an action game like this, a battle game and the like which require a quick response to an input by the player, this bad response is of problem, and decreases an interest factor of a game. Therefore, the technique according to Patent Document 1 basically adopts a drawing using a first person perspective, and displays, straight away, an image showing an enemy character suffering a damage without drawing an image showing the punching motion of the player when it is determined that the punch hits the enemy character.

Further, when the above-described game apparatus represents and displays a punch thrown by a character controlled by the player, it is necessary to render, after the player finishes the punch action, an image representing the punch action based on the type of the punch, and thus the representation and display of the user's action in increasingly delayed.

Therefore, in certain example embodiments a storage medium is provided having an information processing program stored thereon and an information processing apparatus which are used for executing a process of quickly representing an action of a user in accordance with data outputted by an acceleration sensor.

The reference numerals, step numbers and the like in parentheses indicate the correspondence with the embodiment described below in order to aid in understanding the certain example embodiments.

A first aspect is a storage medium having stored thereon an information processing program executed y a computer (10) of an information processing apparatus (5) which executes a process using acceleration data (Da) outputted by an acceleration sensor (701) for detecting acceleration applied to a predetermined housing (7, 71). The information processing program causes the computer to function as an acceleration data acquisition means (an CPU executing step 43, hereinafter describing a step number only), an acceleration determination means (S82 to S89), moving direction calculation means (S48), and a processing means (S49). The acceleration data acquisition means repeatedly acquires the acceleration data. The acceleration determination means determines whether an acceleration represented by the acceleration data acquired by the acceleration data acquisition means is an acceleration (Dd) at the time of accelerating, which is applied when the predetermined housing is moved and accelerated in a predetermined direction, or is an acceleration (De) at the time of decelerating, which is applied when the predetermined housing is moved and decelerated in the predetermined direction. The moving direction calculation means calculates a moving direction (dir) in which the predetermined housing moves by using the acceleration at the time of decelerating which is determined by the acceleration determination means. The processing means performs a predetermined process by using the moving direction calculated by the moving direction calculation means.

In a second aspect based on the first aspect, the acceleration determination means includes a first accumulation means (S89), a second accumulation means (S86 to 88), and an attenuation means (S82). The first accumulation means accumulates an acceleration (dp<0) applied to a predetermined direction of the predetermined housing, by using the acceleration data acquired by the acceleration data acquisition means. The second accumulation means accumulates, within a range not exceeding a value accumulated by the first accumulation means, an acceleration (dp>0) applied to a reverse direction of the predetermined direction by using the acceleration data acquired by the acceleration data acquisition means. The attenuation means attenuates values accumulated by the first accumulation means and the second accumulation means, each at a predetermined rate (DAMP). The moving direction calculation means calculates the moving direction of the predetermined housing by using a value accumulated by the second accumulation means as the acceleration at the time of decelerating.

In a third aspect based on the second aspect, the acceleration determination means further includes an acceleration component calculation means (S83, S84) for calculating respective acceleration components (dp) applied to a plurality of directions (0th to N−1th direction in FIG. 19) of the predetermined housing, by using the acceleration data acquired by the acceleration data acquisition means. The first accumulation means accumulates acceleration components (dp<0; Yes in S85) applied in a forward direction of each of the plurality of directions. The second accumulation means accumulates acceleration components (dp 0; No in S85) applied in a reverse direction of said each of the plurality of directions within a range not exceeding an accumulated value of the acceleration components applied in the forward direction which is opposite to the reverse direction, the accumulated value being accumulated by the first accumulation means. The attenuation means attenuates, at predetermined rates, respectively, values which are accumulated, with respect to said each of the plurality of directions, by the first accumulation means and the second means. The moving direction calculation means calculates the moving direction of the predetermined housing by using a value, which is obtained by summing values respectively accumulated by the second accumulation means with respect to said each of the plurality of directions, as the acceleration at the time of decelerating.

In a fourth aspect based on the second aspect, the acceleration determination means further includes an acceleration component calculation means. The acceleration component calculation means calculates acceleration components applied to a plurality of directions of the predetermined housing, by using the acceleration data acquired by the acceleration data acquisition means. The first accumulation means accumulates acceleration components applied in a forward direction of each of the plurality of directions. The second accumulation means accumulates acceleration components applied in a reverse direction of said each of the plurality of directions within a range not exceeding an accumulated value of the acceleration components applied in the forward direction which is opposite to the reverse direction, the accumulated value being accumulated by the first accumulation means. The attenuation means attenuates, at predetermined rates, respectively, values which are accumulated, with respect to said each of the plurality of directions, by the first accumulation means and the second accumulation means. The moving direction calculation means calculates the moving direction of the predetermined housing by using a maximum value, among values accumulated by the second accumulation means, as the acceleration of the decelerating.

In a fifth aspect based on the first aspect, the acceleration determination means further includes an acceleration component calculation means. The acceleration component calculation means calculates acceleration components applies to a plurality of directions of the predetermined housing, by using the acceleration data acquired by the acceleration data acquisition means. The acceleration determination means determines whether each of the acceleration components calculated by the acceleration component calculation means is the acceleration at the time of accelerating or the acceleration at the time of decelerating. The moving direction calculation means calculates the moving direction of the predetermined housing by using a value which is obtained by summing the acceleration at the time of decelerating determined by the acceleration determination means with respect to each of the plurality of directions.

In a sixth aspect based on the first aspect, the acceleration determination means further includes an acceleration component calculation means. The acceleration determination means calculates acceleration components applied to a plurality of directions of the predetermined housing, by using the acceleration data acquired by the acceleration data acquisition means. The acceleration determination means determines whether each of the acceleration components calculated by the acceleration component calculation means is the acceleration at the time of accelerating or the acceleration at the time of the predetermined housing by using a maximum value among the acceleration at the time of decelerating determined by the acceleration determination means.

In a seventh aspect based on the first aspect, when a magnitude (Sp) of the acceleration at the time of decelerating is larger than a predetermined value (Sp)_max)(Yes in S102), the moving direction calculation means calculates the moving direction of the predetermined housing by using the acceleration at the time of decelerating.

In an eighth aspect based on the seventh aspect, the computer is further caused to function as an elapsed time measuring means (S105, S107). The elapsed time measuring means measures an elapsed time (Dh) after the moving direction is calculated by the moving direction calculation means. The processing means performs the predetermined process by using the moving direction calculated by the moving direction calculation means when the elapsed time reaches a predetermined time.

In a ninth aspect based on the seventh aspect, the computer is further caused to function as a predetermining value setting means (S104). The predetermined value setting means sets, when the magnitude of the acceleration at the time of decelerating becomes larger than the predetermined value, the magnitude of the acceleration at the time of decelerating as a latest predetermined value.

In a tenth aspect based on the first aspect, when the magnitude of the acceleration at the time of decelerating becomes smaller than the predetermined value, the predetermined value setting means decreases the predetermined value by a predetermined amount.

In an eleventh aspect based on the ninth aspect, the predetermined value setting means further sets a fixed value previously, in addition to the predetermined value. When the magnitude of the acceleration at the time of decelerating is larger than both of the predetermined value and the fixed value (Yes in S102), the moving direction calculation means calculates the moving direction of the predetermined housing by using the acceleration at the time of decelerating.

In a twelfth aspect based on the first aspect, the computer is further caused to function as a deceleration vector calculation means (S90). The deceleration vector calculation means calculates a deceleration vector (Df), which represents a direction in which the predetermined housing is moving at a decelerated rate, by using the acceleration at the time of decelerating determined by the acceleration determination means. The moving direction calculation means calculates the moving direction by using the deceleration vector calculated by the deceleration vector calculation means.

In a thirteenth aspect based on the twelfth aspect, the acceleration determination means includes a first accumulation means, a second accumulation means, and an attenuation means. The first accumulation means accumulates an acceleration applied in a predetermined direction of the predetermined housing, by using the acceleration data acquired by the acceleration data acquisition means. The second accumulation means accumulates, within a range not exceeding a value accumulated by the first accumulation means, an acceleration applied in a reverse direction of the predetermined direction by using the acceleration data acquired by the acceleration data acquisition means. The attenuation means attenuates value accumulated respectively by the first accumulation means and the second accumulation means, each at a predetermined rate. The deceleration vector calculation means calculates the deceleration vector by using a value accumulated by the second accumulation means as an accumulated value of the acceleration at the time of decelerating.

In a fourteenth aspect based on the thirteenth aspect, the acceleration determination means further included an acceleration component calculation means. The acceleration component calculation means calculates acceleration components applied to a plurality of directions of the predetermined housing, by using the acceleration data acquired by the acceleration data acquisition means. The first accumulation means accumulates acceleration components applied in a forward direction of each of the plurality of directions. The second accumulation means accumulates acceleration components applied in a reverse direction of said each of the plurality of directions within a range not exceeding an accumulated value of the acceleration components applied in the forward direction which is opposite to the reverse direction, the accumulated value being accumulated by the first accumulation means. The attenuation means attenuates, at predetermined rates, respectively, values which are accumulated, with respect to said each of the plurality of directions, by the first accumulation means and the second accumulation means. The deceleration vector calculation means calculates the deceleration vector by summing values accumulated by the second accumulation means with respect to said each of the plurality of directions.

In a fifteenth aspect based on the thirteenth aspect, the acceleration determination means further includes an acceleration component calculation means. The acceleration component calculation means calculates acceleration components applied to a plurality of directions of the predetermined housing, by using the acceleration data acquired by the acceleration data acquisition means. The first accumulation means accumulates acceleration components applied in a forward direction of each of the plurality of directions. The second accumulation means accumulates acceleration components applied in a reverse direction of said each of the plurality of the directions within a range not exceeding an accumulated value of the acceleration components applied in the forward direction which is opposite to the reverse direction, the accumulated value being accumulated by the first accumulated means. The attenuation means attenuates, at predetermined rates, respectively, values which are accumulated, with respect to said each of the plurality of directions, by the first accumulation means and the second accumulation means. The deceleration vector calculation means calculates the deceleration vector by using a maximum value, among values accumulated by the second accumulation means.

In a sixteenth aspect based on the twelfth aspect, the computer is further caused to function as a gravity direction calculation means (S44). The gravity direction calculation means calculates a direction of a gravity acceleration (Pos) applied to the predetermined housing by using the acceleration data acquired by the acceleration data acquisition means. The moving direction calculation means calculates the moving direction relative to the direction of the gravity acceleration being applied in a accordance with the direction of the gravity acceleration calculated by the gravity direction calculation means and a direction represented by the deceleration vector.

In a seventh aspect based on the twelfth aspect, when a magnitude of the deceleration vector calculated by the deceleration vector calculation means is larger than a predetermined value, the moving direction calculation means calculates a direction of the deceleration vector as the moving direction.

In a eighteenth aspect based on the seventeenth aspect, the computer is further caused to function as a predetermined value setting means. The predetermined value setting means sets, when the magnitude of the deceleration vector calculated by the deceleration vector calculation means becomes larger than the predetermined value, the magnitude of the deceleration vector as a new predetermined value.

In a nineteenth aspect based on the eighteenth aspect, when the magnitude of the deceleration vector calculated by the deceleration vector calculation means becomes smaller than the predetermined value, the predetermined value setting means decreases the predetermined value by a predetermined amount.

In a twentieth aspect based on the eighteenth aspect, the predetermined value setting means further sets a previously fixed value, in addition to the predetermined value. When the magnitude of the deceleration vector calculated by the deceleration vector calculation means is larger than both of the predetermined value and the fixed value, the moving direction calculation means calculates the direction of the deceleration vector as the moving direction.

In a twenty-first aspect based on the seventeenth aspect, the computer is further caused to function as an elapsed time measuring means. The elapsed time measuring means measures an elapsed time after the moving direction is calculated by the moving direction calculation means. The processing means performs the predetermined process by using the moving direction calculated by the moving direction calculation means when the elapsed time reaches a predetermined time.

In a twenty-second aspect based on the first aspect, when acquiring acceleration data representing as acceleration applied to a predetermined direction of the predetermined housing and acquiring acceleration data representing an acceleration applied in a reverse direction of the predetermined direction immediately thereafter, the acceleration determination means determines the acceleration data representing the acceleration applied to the predetermined direction of the predetermined housing as the acceleration at the time of accelerating, and also determines the acceleration data representing the acceleration applied n the reverse direction of the predetermined direction as the acceleration at the time of decelerating.

In a twenty-third aspect based on the first aspect, the computer is further caused to function as a gravity component calculation means (S45) and a gravity component elimination means (S46). The gravity component calculation means calculates a gravity acceleration component (Db) applied to the predetermined housing by using the acceleration data acquired by the acceleration data acquisition means. The gravity component elimination means eliminates the gravity acceleration component, which is calculated by the gravity component calculation means, from acceleration represented by the acceleration data acquired by the acceleration data acquisition means. The acceleration determination means uses an acceleration (De) from which the gravity acceleration component has been eliminated by the gravity component eliminated means.

A twenty-fourth aspect is an information processing apparatus for performing a process using acceleration data outputted by an acceleration sensor which detects an acceleration applied to a predetermined housing. The information processing apparatus includes an acceleration data acquisition means, an acceleration determination means, a moving directions calculation means, and a processing means. The acceleration data acquisition means acquires the acceleration data repeatedly. The acceleration determination means determines whether an acceleration represented by the acceleration data acquired by the acceleration data acquisition means in an acceleration at the time of accelerating, which is applied when the predetermined housing is moved and accelerated in a predetermined direction, or is an acceleration at the time of decelerating, which is applied when the predetermined housing is moved and decelerated in the predetermined direction. The moving direction calculation means calculates a moving direction in which the predetermined housing moves by using the acceleration at the time of decelerating which is determined by the acceleration determination means. The processing means performs a predetermined process by using the moving direction calculated by the moving direction calculation means.

According to the above-described first aspect, by using the acceleration at the time of decelerating which is applied when the housing is moving at a decelerated rate, it is possible to recognize directions of the housing being moved and waved increasingly quickly, and calculate the directions accurately.

According to the above-described second and thirteenth aspects, positive variables are set by accumulating an acceleration applied in a predetermined direction and an acceleration applied in a reverse direction of the predetermined direction, respectively, and the positive variables are each attenuated at a predetermined rate. The variables are controlled such that a variable for the reverse direction does not exceed a variable for the predetermined direction, whereby and acceleration applied at the time of accelerating and an acceleration at the time of decelerating applied immediately after the acceleration are paired up as a set. Accordingly, the acceleration at the time of decelerating can be determined accurately.

According to the above-described third, fifth, and fourteenth aspects, determination of the acceleration at the time of decelerating is performed in a plurality of directions, whereby accuracy in calculating the moving direction of the housing is improved. Further, the acceleration at the time of decelerating with respect to each of the plurality of directions is summed, the thus the moving direction of the housing is not limited to the plurality of directions, but is represented in an analog manner, whereby a most appropriate direction is calculated. Further, even if any one of the plurality of directions has a noise, the direction having the noise will not be misrecognized as the moving direction of the housing.

According to the above-described fourth, sixth, and fifteenth aspects, determination of the acceleration at the time of decelerating is performed with respect to each of the plurality of directions, whereby accuracy in calculating the moving direction of the housing is increasing improved. Further, by using the acceleration at the time of maximumly decelerating, a process of calculating the moving direction of the housing, among the plurality of directions, can be simplified.

According to the above-described seventh and seventeenth aspects, since the moving direction is calculated when the magnitudes of the acceleration at the time of decelerating and the deceleration vector are each larger than the predetermined value, it is possible to prevent the moving direction of the housing from being calculated wrongly.

According to the above-described eighth and twenty-first aspects, the elapsed time after calculating the moving direction can be used as a degree of reliability of the moving direction, and therefore, when a more assured moving direction is to be obtained, a predetermined processing can be performed by using a direction calculated when the elapsed time has reached a predetermined time.

According to the above-described ninth and eighteenth aspects, since maximum values representing the magnitudes of the acceleration at the time of decelerating and the deceleration vector are each set as a predetermined value, it is possible to prevent a case where the calculation of the moving directions is performed frequently.

According to the above-described tenth and nineteenth aspects, since the predetermined values attenuates, it is possible to calculate a subsequent new moving direction.

According to the above-described eleventh and twentieth aspects, an effect of an acceleration exerted by a force other than movement of the housing, such as a gravity acceleration, can be eliminated, whereby it is possible to prevent miscalculation of the moving direction of the housing.

According the above-described twelfth aspect, by using the acceleration at the time of decelerating, the deceleration vector representing the moving direction of the housing at a decelerated rate is calculated. Accordingly the moving direction or the waving direction of the housing can be calculated two-dimensionally or three-dimensionally.

According to the above-described sixteenth aspect, it is possible to calculate the moving direction of the housing relative to the gravity direction applied to the housing.

According to the above-described twenty-second aspect, by detecting the acceleration, which is applied in the reverse direction of the predetermined direction immediately after the acceleration is applied in the predetermined direction, it is possible to easily determine that the acceleration in the opposite direction is the acceleration applied at the time of decelerating.

According to the above-described twenty-third aspect, by eliminating the gravity component constantly applied to the housing, it is possible to accurately calculate the moving direction and the waving direction of the housing.

According to the information processing apparatus, it is possible to obtain the same effect as the storage medium having the above-described information processing program stored thereon.

These and other objects, features, aspects, and advantages of certain example embodiments will become more apparent from the following detailed description when taken in conjunction with the accompanying drawings.

BRIEF DESCRIPTION OF THE DRAWINGS

FIG. 4 is a perspective view illustrating the controller 7 shown in FIG. 3 as viewed from a bottom front side thereof;

FIG. 7 is a block diagram illustrating a configuration of the controller 7 shown in FIG. 3;

FIG. 8 is a diagram illustrating in general a state where a game is played using the controller 7 shown in FIG. 3;

FIG. 9 is a diagram illustrating a first example of a game process or an information processing performed in accordance with a moving direction of the controller 7;

FIG. 10 is a diagram illustrating a second of the game process or the information processing performed in accordance with the moving direction of the controller 7;

FIG. 12 is a diagram illustrating a fourth example of the game process or the information processing performed in accordance with the moving direction of the controller 7;

FIG. 13 is a diagram illustrating a fifth example of the game process or the information processing performed in accordance with the moving direction of the controller 7;

FIG. 19 is a diagram illustrating an exemplary N directions which are set so as to determine a moving direction dir.

DESCRIPTION OF THE PREFERRED EMBODIMENTS

Figure 1:
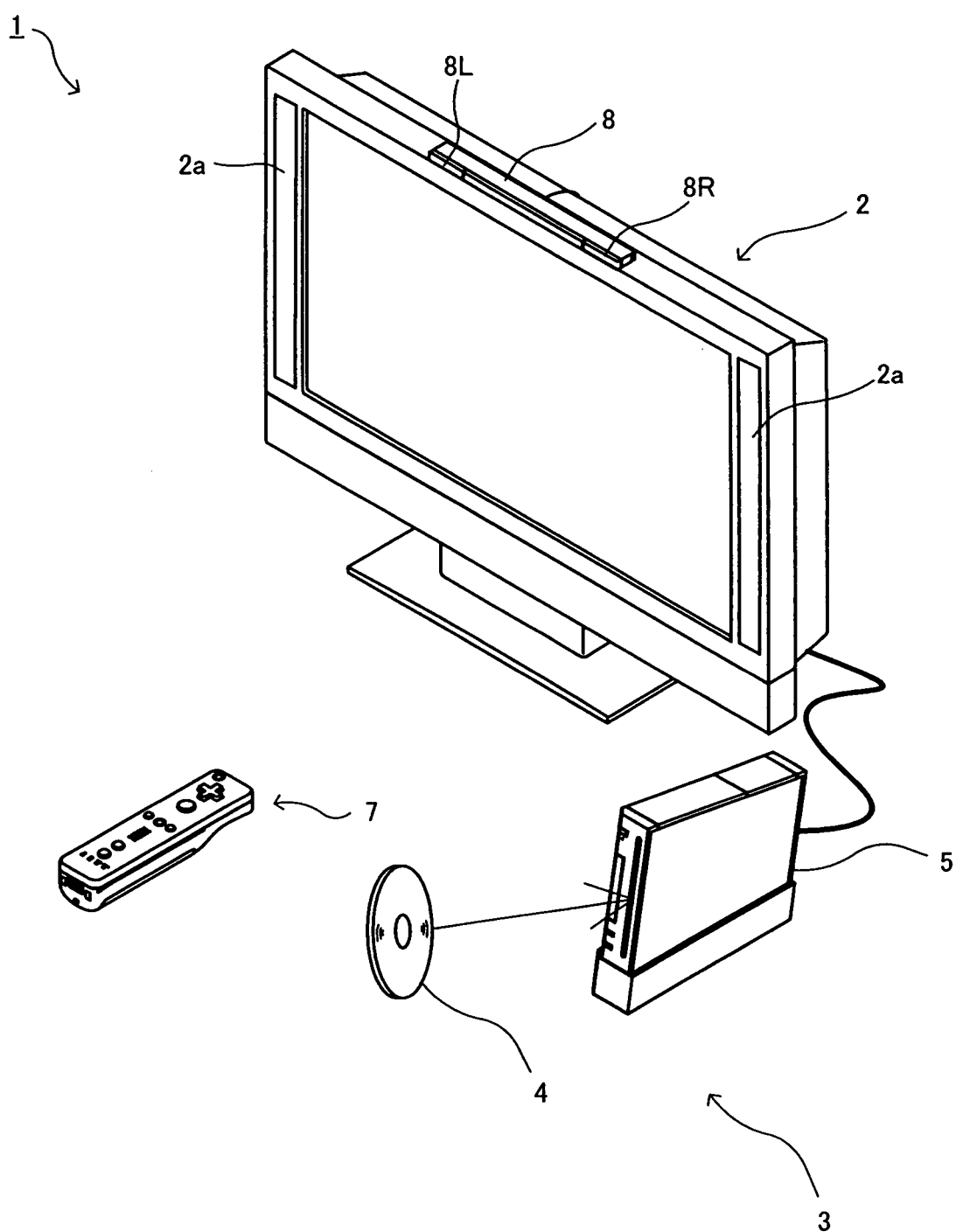
FIG. 1 is an external view illustrating a game system 1 according to an embodiment.
Figure 2:
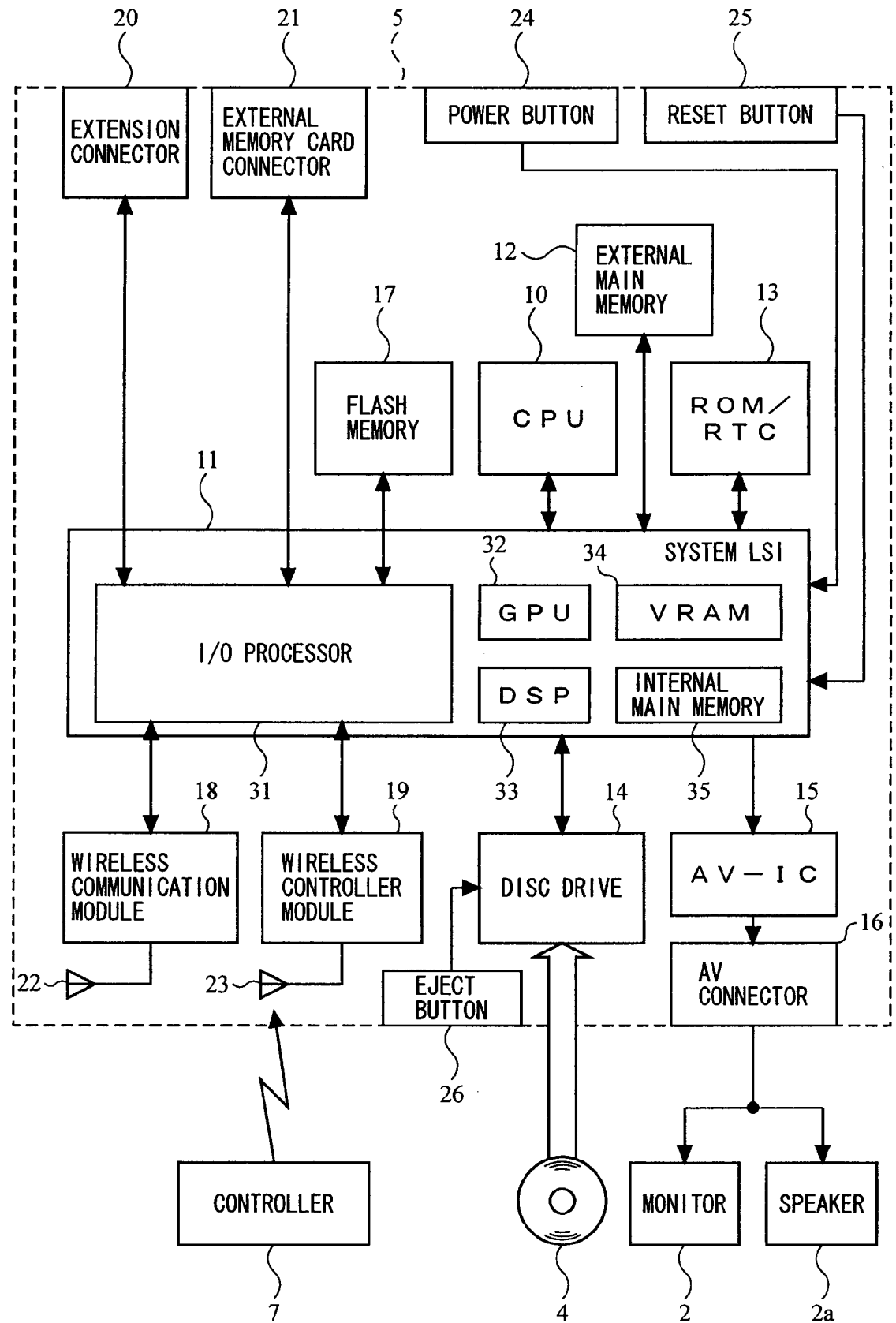
FIG. 2 is a functional block diagram illustrating a game apparatus body 5 shown in FIG. 1.

With reference to FIG. 1, and apparatus for executing an information processing program according to an embodiment will be described. Hereinafter, for specific description, a game system including a stationary game apparatus body 5 will be described as an example of the above-described apparatus. FIG. 1 is an external view illustrating the game system 1 including a stationary game apparatus 3. FIG. 2 is a block diagram illustrating the game apparatus body 5. Hereinafter, the game system 1 will be described.

As shown in FIG. 1, the game system 1 includes a home-use television receiver (hereinafter referred to as a monitor) 2 typifying a display means, and a stationary game apparatus 3 connected to the monitor 2 via a connection cord. The monitor 2 includes speakers 2a for outputting, as a sound, a sound signal outputted by the game apparatus body 5. Further, the game apparatus 3 includes an optical disc 4 having recorded thereon a game program typifying the information processing program of certain example non-limiting embodiments, the game apparatus body 5 accommodating a computer which executes the game program in the optical disc 4 so as to output and display a game screen on the monitor 2, and a controller 7 for providing the game apparatus body 5 with operation information necessary to a game so as to operate a character or the like displayed on the game screen.

The game apparatus body 5 embeds a wireless controller module 19 (see FIG. 2). The wireless controller module 19 receives data wirelessly transmitted from the controller 7, and transmits the data from the game apparatus body 5 to the controller 7, whereby the controller 7 and the game apparatus body 5 are connected with each other through a wireless communication. Further, the optical disc 4 typifying an exchangeable information storage medium is detachably mounted on the game apparatus body 5.

Further, the game apparatus body 5 has mounted thereon a flash memory 17 (see FIG. 2) which functions as a back-up memory for fixedly storing data such as saved data. The game apparatus body 5 executes a game program or the like stored on the optical disc 4, thereby displaying a result of the game program on the monitor 2 as a game image. The game program or the like may not only be stored on the optical disc 4, but also be previously stored in the flash memory, and then executed. Further, the game apparatus body 5 uses the saved data stored in the flash memory 17, and reproduces a game state executed in the past, thereby displaying a game image on the monitor 2. Accordingly, a player of the game apparatus body 5 operates the controller 7 while watching the game image displayed on the monitor 2, thereby enjoying a process of the game.

The controller 7 wirelessly transmits transmission data such as the operation information, by using the technique of Bluetooth®, for example, to the game apparatus body 5 having the wireless controller module 19 embedded therein. The controller 7 is an operation means for mainly operating an object or the like displayed on a display screen of the monitor 2. The controller 7 has a housing which is small enough to be held by one hand, and a plurality of operation buttons (such as a cross key, a stick and the like) exposed on a surface of the housing. As described later in detail, the controller 7 includes an imaging information calculation section 74 for taking an image viewed from the controller 7. As an example of an imaging subject of the imaging information calculation section 74, two LED modules (hereinafter referred to as markers) 8L and 8R are provided in the vicinity of the display screen of the monitor 2. The markers 8L and 8R each output infrared light or the like forward from the monitor 2. Further, the controller 7 can cause the communication section 75 to receive the transmission data which is wirelessly transmitted by the wireless controller module 19 of the game apparatus body 5, and also to generate a sound and a vibration based on the transmission data.

Next, with reference to FIG. 2, an internal configuration of the game apparatus body 5 will be described. FIG. 2 is a block diagram illustrating a configuration of the game apparatus body 5. The game apparatus body 5 includes a CPU (Central Processing Unit) 10, a system LSI (Large Scale Integration) 11, and external main memory 12, a ROM/RTC (Read Only Memory/Real Time Clock) 13, a disc drive 14, an AV-IC (Audio Video-Integrated Circuit) 15 and the like.

The CPU 10 executes the game program stored in the optical disc 4, and then executes the game process. The CPU 10 also functions as a game processor. The CPU 10 is connected to the system LSI 11. To the system LSI 11, other than the CPU 10, the external main memory 12, the ROM/RTC 13, the disc drive 14, and the AV-IC 15 are connected. The system LSI 11 executes processed such as a control of data transfer among respective component parts connected to the system LSI 11, generation of an image to be displayed, and a acquisition of data from an external apparatus. The internal configuration of the system LSI 11 will be described later. The external main memory 12, which is volatile, stores a program such as a game program read from the optical disc 4 and a game program ready from the flash memory, and various data. The external main memory 12 is used as a work area or buffer area in CPU 10. The ROM/RTC 13 has a ROM (so called a boot ROM) which incorporates a program for booting up the game apparatus body 5 therein, and a clock circuit (a RTC) for counting time. The disc drive 14 reads program data, texture data or the like from the optical disc 4, and write the read data into an internal main memory 35 or an external main memory 12 described later.

To the system LSI 11, provided are an I/O processor 31, a GPU (Graphics Processor Unit) 32, a DSP (Digital Signal Processor) 33, a VRAM (Video RAM) 34, and the internal main memory 35. Although not shown in a diagram, these components parts 31 to 35 are connected to one another via an internal bus.

The GPU 32 forms a part of a drawing means, and generates an image in accordance with a graphics command given by the CPU 10. The VRAM 34 stores data (such as polygon data and texture data) which is necessary to cause the GPU 32 to execute the graphics command. When the image is generated, the GPU 32 generates the image data by using the data stored in the VRAM 34.

The DSP 33 functions as an audio processor, and generates audio data by using sound data and sound waveform (sound quality) data which are stored in the internal main memory 35 and the external main memory 12.

The image data and the audio data, which are generated as above described, are read by the AV-IC 15. The AV-IC 15 outputs the read image data to the monitor 2 via the AV connector 16, and also outputs the read audio data to the speakers 2a embedded in the monitor 2. Accordingly, an image is displayed on the monitor 2, and a sound is outputted from the speakers 2a.

The I/O processor 31 executes data transmission with components parts which are connected thereto, and also executes downloading of data from an external apparatus. The I/O processor 31 is connected to the flash memory 17, a wireless communication module 18, the wireless controller module 19, an extension connector 20, and an external memory card connector 21. An antenna 22 is connected to the wireless communication module 18, and An antenna 23 is connected to the wireless controller module 19.

The I/O processor 31 is connected to a network via the wireless communication module 18 and the antenna 22, thereby communicating with other game apparatuses and various servers connected to the network. The I/O processor 31 periodically accesses the flash memory 17 so as to detect data, if any, which is necessary to be transmitted to the network. When the data is detected, the data is transmitted to the network via the wireless communication module 18 and the antenna 22. Further, the I/O processor 31 receives data transmitted from the other game apparatuses or data downloaded from a download server via the network, the antenna 22, and the wireless communication module 18, and stores the received data in the flash memory 17. The CPU 10 executes the game program so as to read the data stored in the flash memory 17, and to use the data in the game program. In the flash memory 17, saved data (result data or intermediate step data) of a game played by using the game apparatus body 5 may be stored, in addition to data transmitted among the game apparatus body 5 and the other game apparatuses or the various servers.

The I/O processor 31 receives operation data and the like transmitted from the controller 7 via the antenna 23 and the wireless controller module 19, and stores (temporarily stores) the transmitted operation data and the like in the buffer area in the internal main memory 35 and the external main memory 12. In the internal main memory 35, as with the external main memory 12, a program such as a game program read from the optical disc 4 and a game program read from the flash memory 17, and various data may be stored. The internal main memory 35 may be also used as the work area or the buffer area in the CPU 10.

Further, to the I/O processor 31, the extension connector 20 and the external memory card connector 21 are connected. The extension connector 20 functions as an interface such as an USB or SCSI, and is capable of communicating with a network, as a substitute for the wireless communication module 19, by connecting with a medium such as an external storage medium, peripheral equipment such as other controllers, or wired communication connector. The external memory card connector 21 allows connection with an external storage medium such as a memory card. For example, the I/O processor 31 accesses the external storage medium via the extension connector 20 or the external memory card connector 21, thereby storing and reading data.

Further, the game apparatus body 5 includes (on a front main surface thereof) a power button 24 of the game apparatus body 5, a game process reset button 25, a slot through which the optical disc 4 is mounted thereon, and an eject button 26 used for dismounting the optical disc 4 through the slot of the game apparatus body 5, and the like. The power button 24 and the reset button 25 are connected to the system LSI 11. The power button 24 is turned on and the power is supplied to respective component parts of the game apparatus body 5 via an AC adaptor (which is not shown). When the reset button is pressed, the system LSI 11 reboots a boot-up program of the game apparatus body 5. The eject button 26 is connected to the disc drive 14. When the eject button 26 is pressed, the optical disc 4 is dismounted from the disc drive 14.

Figure 3:
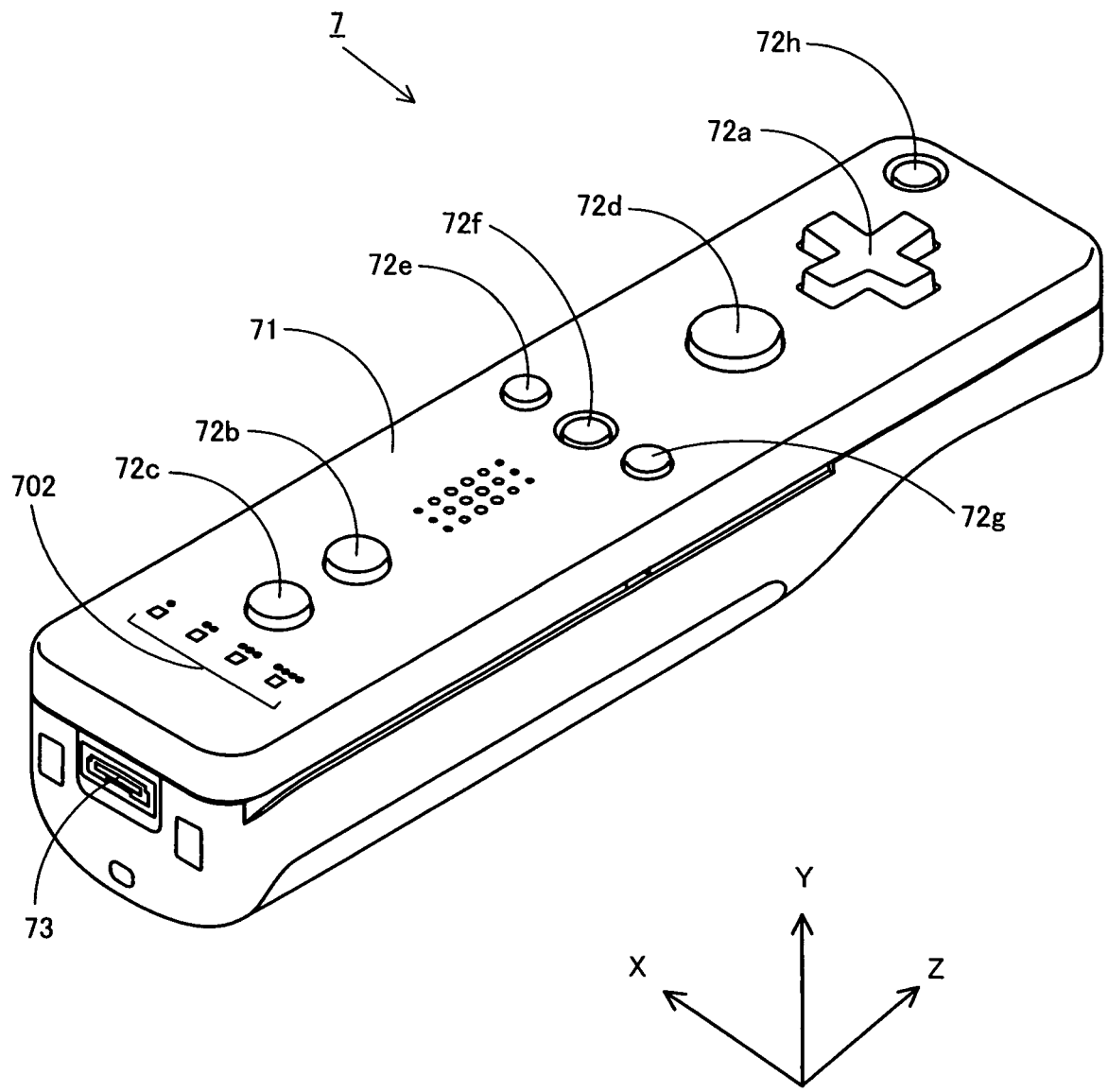
FIG. 3 is a perspective view illustrating a controller 7 show in FIG. 1 as viewed from a top rear side thereof.

With reference to FIGS. 3 and 4, the controller 7 will be described. FIG. 3 is a perspective view illustrating the controller 7 as viewed from the top rear side thereof. FIG. 4 is a perspective view illustrating the controller 7 as viewed from the bottom front side thereof.

As shown in FIGS. 3 and 4, the controller 7 includes a housing 71 formed by plastic molding or the like. The housing 71 has plurality of operation sections 72. The housing 71 has a generally parallelepiped shape extending in a longitudinal direction from front to rear. The overall size of the housing 71 is small enough to be held by one hand of an adult or even a child.

At the center of the front part of a top surface of the housing 71, a cross key 72a is provided. The cross key 72a is a cross-shaped four-direction push switch. The cross key 72a includes operation portions corresponding to the four directions (front, rear, right and left), which are respectively located on cross-shaped projecting portions arranged at intervals of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or select one of a plurality or options.

Although the cross key 72a is an operation section for outputting an operation signal in accordance with the above-described direction input operation performed by the player, such an operation section may be provided in another form. For example, the cross key 72a may be replaced with an operation section which as four push switches which extend in four directions, respectively, so as to form a cross, and outputs an operation signal in accordance with the player pressing one of the push switches. Further, the cross key 72a may be replaced with an operation section having the four push switches in combination with a center switch positioned at the center of the cross of the four push switches. Alternatively, the cross key 72a may be replaced with an operation section which includes an inclinable stick (so-called a joy stick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Behind the cross key 72a on the top surface of the housing 71, a plurality of operation buttons 72b, 72c, 72d, 72e, 72f and 72g are provided. The operated buttons 72b, 72c, 72d, 72e, 72f and 72g are each an operation section for outputting a respective operation signal assigned to the operated buttons 72b, 72c, 72d, 72e, 72f, or 72g when the player pressed a head thereof. For example, the operation buttons 72b, 72c, and 72d are assigned with functions of a first button, a second button, and an A button, for example. Further, the operation buttons 72e, 72f and 72g are assigned with functions of a minus button, a home button, a plus button, for example. The operation buttons 72a, 72b, 72c, 72d, 72e, 72f and 72g are assigned with various operation functions in accordance with the game program executed by the game apparatus body 5. In an exemplary arrangement shown in FIG. 3, the operation buttons 72b, 72c and 72d are arrange in a line at the center on the top surface of the housing 71 in the front-rear direction. The operation buttons 72e, 72f and 72g are arranged in a line in the left-right direction between the operation buttons 72b and 72d on the top surface of the housing 71. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for remote-controlling the power of the game apparatus body 5 to be on or off. The operation button 72b also has a top surface thereof buried in the top surface of the housing 71, so as not to be inadvertently pressed by the player.

Behind the operation button 72c, on the top surface of the housing 71, a plurality of LEDs 702 are provided. The controller 7 is assigned with a controller type (number) so as to be distinguishable from the other controllers 7. For example, the LEDs 702 are used for informing the player of the controller type which is currently set to controller 7 that he or she is using. Specifically, a signal is transmitted from the wireless controller module 19 to the controller 7 so as to light up one LED, among the plurality of LEDs 702, depending on the controller type.

On the top surface of the housing 71, a sound hold for outputting, to the outside, a sound from a speaker (a speaker 706 shown in FIG. 5) described below is provided between the operation button 72b and the operation buttons 72e, 72f, and 72g.

On a button surface of the housing 71, a recessed portion is formed. The recessed portion is formed at a position at which an index finger or middle finger of the player is located when the player holds the controller 7 by one hand so as to orient the front surface of the controller 7 toward the markers 8L and 8R. On a slope surface of the recessed portion, an operation button 72i is provided. The operation button 72i is an operation section acting as, for example, a B button.

On a surface of the housing 71, an image pickup element 743 included in the imaging information calculation section 74 is provided. The imaging information calculation section 74 is a system for analyzing image data taken by the controller 7 and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. The imaging information calculation section 74 will be described later in detail. On a rear surface of the housing 71, the connector 73 is provided. The connector 73 is, for example, and edge connector, and is used for engaging and connecting with a connecting cable, for example.

Here, for making the below description specific, a coordinate system is defined for the controller 7. As shown in FIGS. 3 and 4, an X-axis, a Y-axis, and a Z-axis, which are orthogonal to each other, are defined for the controller 7. Specifically, the longitudinal direction of the housing 71 corresponding to the front-rear direction of the controller 7 is defined as the Z-axis direction, and a direction toward the front surface (a surface on which the imaging information calculation section 74 is mounted) of the controller 7 is a Z-axis positive direction. The up-down direction of the controller 7 is defined as the Y-axis direction, and a direction toward the top surface (a surface on which the operation button 72a is provided) of the housing 71 is defined as the X-axis positive direction. The left-right direction of the controller 7 is defined as the X-axis direction, and a direction toward the left side surface (a side surface which is not shown in FIG. 3) of the housing 71 is defined as an X-axis positive direction.

Figure 5:
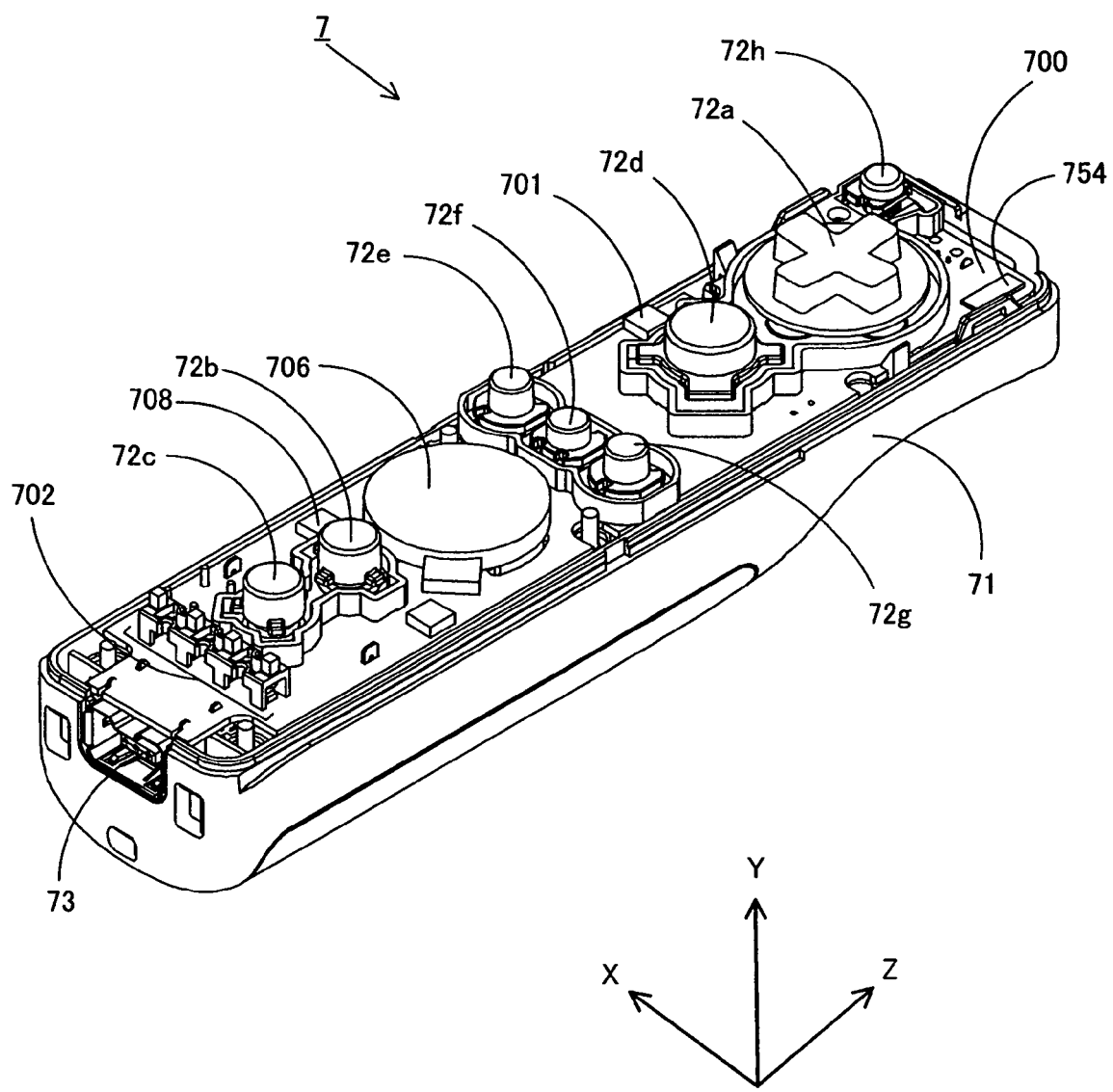
FIG. 5 is a perspective view illustrating a state where an upper casing of the controller 7 shown in FIG. 3 is removed.
Figure 6:
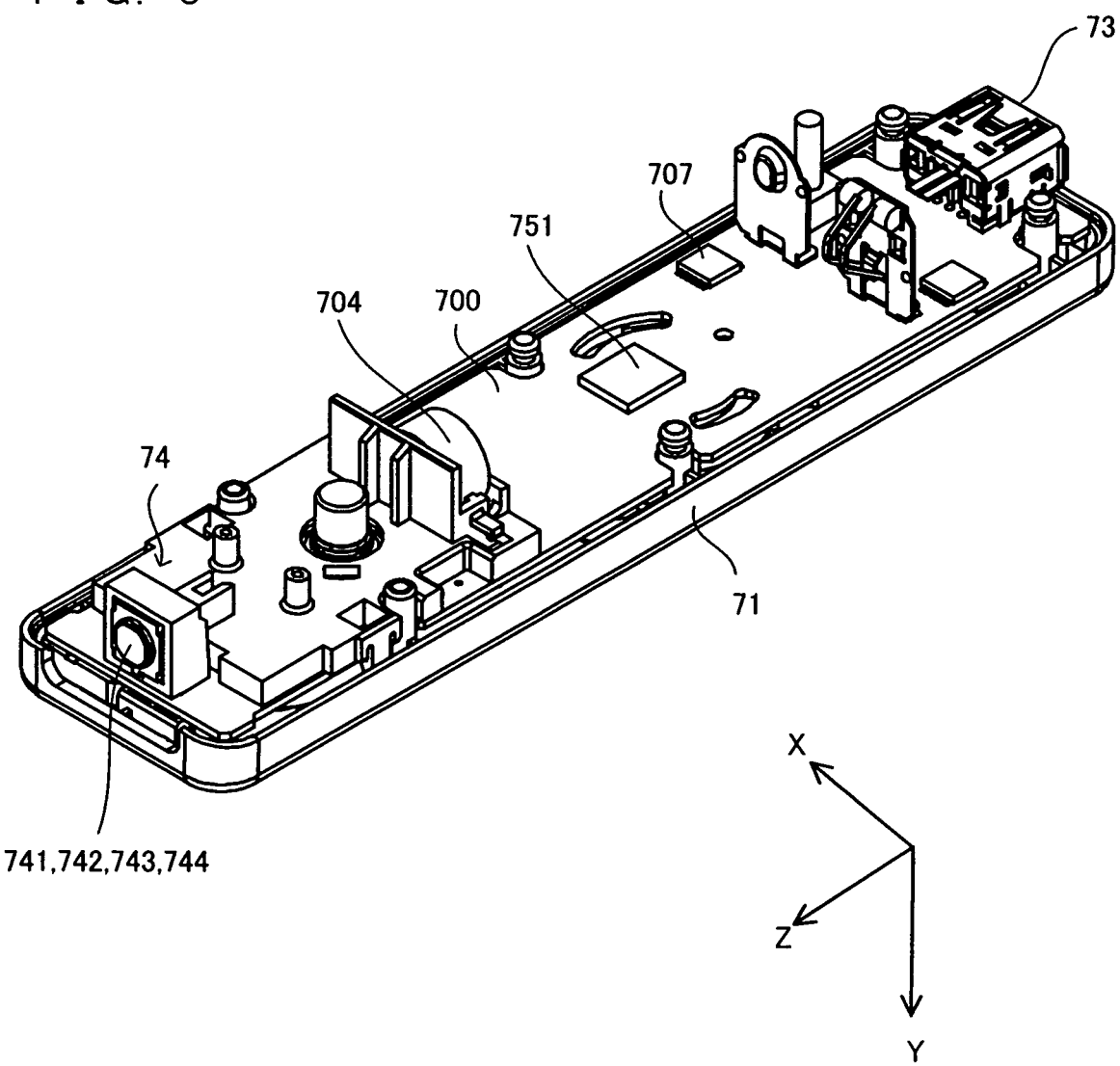
FIG. 6 is a perspective view illustrating a state where a lower casing of the controller 7 shown in FIG. 4 is removed.

Next, with reference to FIGS. 5 and 6, and internal structure of the controller 7 will be described. FIG. 5 is a perspective view illustrating, as viewed from the top rear surface of the controller 7, a state where and upper casing (a part of the housing 71) of the controller is removed. FIG. 6 is a perspective view illustrating, as viewed from the bottom front surface of the controller 7, a state where a lower casing (a part of the housing 71) of the controller 7 is removed. FIG. 6 is a perspective view illustrating a reverse side of a substrate 700 shown in FIG. 5.

As shown in FIG. 5, the substrate 700 is fixed inside the housing 71. On a top main surface of the substrate 700, the operation buttons 72a, 72b, 72c, 72d, 72e, 72f, 72g and 72h, an acceleration sensor 701, the LEDs 702, an antenna 754 and the like are provided. These elements are connected to a microcomputer 751 (see FIGS. 6 and 7) and the like via lines (not shown) formed on the substrate 700 and the like. The wireless module 753 (see FIG. 7) and the antenna 754 allow the controller 7 to act as a wireless controller. The quartz oscillator (not shown), which is provided inside the housing 71, generates a reference clock of the microcomputer 751 described later. On a top main surface of the substrate 700, the speaker 706 and an amplifier 708 are provided. Further, the acceleration sensor 701 is provided on the substrate 700 to the left of the operation button 72d. That is, the acceleration sensor 701 is provided not at the center portion of the substrate 700 but near the periphery of the substrate 700. Accordingly, the acceleration sensor 701 is capable of detecting a directional change of the gravity acceleration and an acceleration containing a component exerted due to the centrifugal force, in accordance with the controller 7 rotating about the longitudinal direction thereof. Therefore, the game apparatus body 5 and the like can perform a predetermined calculation so as to determine a movement of the controller 7 with sufficient accuracy based on the acceleration data having been detected.

As shown in FIG. 6, at a front edge of a bottom main surface of the substrate 700, the imaging information calculation section 74 is provided. The imaging information calculation section 74 includes an infrared filter 741, a lens 742, the image pickup element 743, and an image processing circuit 744 located in order, respectively, from the front surface of the controller 7 on the bottom main surface of the substrate 700. At a rear edge of the bottom main surface of the substrate 700, the connector 72 is attached. Further, on a bottom main surface of the substrate 700, a sound IC 707 and the microcomputer 751 are provided. The sound IC 707, connected to the microcomputer 751 and the amplifier 708 via the line formed on the substrate 700 and the like, outputs a sound signal to the speaker 706 via the amplifier 708 in accordance with the sound data transmitted from the game apparatus body 5.

On the bottom main surface of the substrate 700, a vibrator 704 is attached. The vibrator 704 may be, for example, a vibration motor or a solenoid. The vibrator 704, connected to the microcomputer 751 via the line formed on the substrate 700 and the like, is powered on/off in accordance with vibration data transmitted from the game apparatus body 5. The controller 7 is vibrated by an actuation of the vibrator 704, and the vibration is conveyed to the player's hand holding the controller 7. Thus, a so-called vibration-feedback game is realized. The vibrator 704 is provided near the front part of the housing 71, and therefore a large vibration of the housing 71 allows the player holding the controller 7 to easily feel the vibration.

Next, with reference to FIG. 7, an internal configuration of the controller 7 will be described. FIG. 7 is a block diagram illustrating a configuration of the controller 7.

As shown in FIG. 7, the controller 7 includes the communication section 75, in addition to the operation section 72, the imaging information calculation section 74, the acceleration sensor 701, the vibrator 704, the speaker 706, the sound IC 707, and the amplifier 708 as described above.

The imaging information calculation section 74 includes the infrared filter 741, the lens 742, the image pickup element 743, and the image processing circuit 744. The infrared filter 741 allows only infrared light to pass therethrough, among light incident on the front surface of the controller 7. The lens 742 collects the infrared light which has passed through the infrared filter 741 and outputs the infrared light to the image pickup element 743. The image pickup element 743 is a solid-state image pickup device such as, for example, a CMOS sensor or a CCD. The image pickup element takes an image of the infrared light collected by the lens 742. Accordingly, the image pickup element 743 takes an image of only the infrared light which has passed through the infrared filter 741 and generates image data. The image data generated by the image pickup element 743 is processed by the image processing circuit 744. Specifically, the image processing circuit 744 processes the image data obtained by the image pickup element 743, detects an area thereof having a high brightness, and outputs process result data, which represents the detected position coordinates and size of the area, to the communication section 75. The imaging information calculation section 74 is fixed to the housing 71 of the controller 7. The imaging direction of the imaging information calculation section 74 can be changed by changing the direction of the housing 71.

The controller 7 preferably includes a three-axial (X-axis, Y-axis, and Z-axis) acceleration sensor 701. The three-axial acceleration sensor 701 detects a linear acceleration in three directions, that is, the up-down direction (Y-axis shown in FIG. 3), the left-right direction (X-axis shown in FIG. 3), and the front-rear direction (Z-axis shown in FIG. 3). Further, as described an embodiment hereinbelow, an acceleration detection means for detecting a linear acceleration along at least two axial directions may be used depending on a type of a control signal used for a game process. For example, the acceleration sensor 701 as described above may be of the type available from Analog Devices, Inc. or STMicroelectronics N.V. Preferably, the acceleration sensor 701 is an electrostatic capacitance (capacitance-coupling) type that is based on silicon micro-machined MEMS (Micro Electro Mechanical Systems) technology. However, any other suitable technology of acceleration detection means (for example, piezoelectric type or piezoresistance type) now existing or later developed my be used to provide the acceleration sensor 701.

An acceleration detection means, as used in the acceleration sensor 701, is only capable of detecting an acceleration (linear acceleration) along a straight line corresponding to each axis of the acceleration sensor 701. In other words, the direct output of the acceleration sensor 701 is limited to signals indicative of the linear acceleration (static or dynamic) along each of the three axes thereof. As a result, the acceleration sensor 701 cannot directly detect movement along a non-linear (e.g. arcuate) path, rotation, rotational movement, angular displacement, tilt, position, attitude, or any other physical characteristic.

However, when a computer, such as a processor (for example, the CPU 10) of the game apparatus or a processor (for example, the microcomputer 751) of the controller, processes acceleration signals outputted from the acceleration sensor 701, additional information relating to the controller 7 can be inferred or calculated (determined), as on skilled in the art will readily understand form the description herein.

For example, a case where it is anticipated that the computer will process the acceleration signal outputted from the acceleration sensor 701 of the controller 7 which is in a static state (that is, a case where it is anticipated that an acceleration detected by the acceleration sensor 701 will include only a gravity acceleration) will be described. When the controller 7 is actually in the static state, it is possible to determine whether or not the controller 7 tilts relative to the gravity direction and to also determine a degree of the tilt, based on the acceleration having been detected. Specifically, when a state where a detection axis of the acceleration sensor 701 is directing toward the vertically downward direction is set as a reference, it is possible to determine whether or not the controller 7 tilts relative to the vertically downward direction, based on only whether or not IG (gravity acceleration is applied in the direction of the detection axis of the acceleration sensor 701. Further, it is possible to determine a degree to which the controller 7 tilts relative to the vertically downward direction, based on a magnitude of the acceleration applied in the direction of the detection axis. Further, in the case of the acceleration sensor 701 capable of detecting an acceleration in multi-axial directions, the acceleration signals having been detected in the respective axes are processed so as to more specifically determine the degree to which the controller 7 tilts relative to the gravity direction. In this case, although the processor may calculate, based on the output from the acceleration sensor 701, data representing an angle at which the controller 7 tilts, an approximate degree to which the controller 7 tilts may be inferred based on the output form the acceleration sensor 701 without calculating the data representing the angle of the tilt. Thus, when the acceleration sensor 701 is used in combination with the processor, the tilt, attitude, or position of the controller 7 can be determined.

On the other hand, in a case where it is anticipated that the acceleration sensor 701 will be in a dynamic state, the acceleration sensor 701 detects an acceleration based on a movement of the acceleration sensor 701, in addition to the gravity acceleration component. Therefore, when the gravity acceleration component is eliminated through a predetermined process, it is possible to determine, for example, a direction in which the controller 7 moves. Specifically, when the controller 7 including the acceleration sensor 701 is dynamically accelerated and moved with a hand of a player, it is possible to calculate various movements and/or positions of the controller 7 by processing the acceleration signals generated by the acceleration sensor 701. Even when it is anticipated that the acceleration sensor 701 will be in the dynamic state, the acceleration based on the movement of the acceleration sensor 701 is eliminated through a predetermined process, whereby it is possible to determine the tilt of the controller 7 relative to the gravity direction.

In another embodiment, the acceleration sensor 701 may include an embedded signal processor or another type of dedicated processor for performing any desired processing of the acceleration signals outputted by an embedded acceleration detection means prior to outputting signals to the microcomputer 751. For example, when the acceleration sensor 701 is intended to detect static acceleration (for example, gravity acceleration), the embedded or dedicated processor could convert the detected acceleration signal to a corresponding tilt angle (or another preferable parameter). Data representing the respective acceleration detected by the acceleration sensor 701 is outputted to the communication section 75.

The communication section 75 includes, the microcomputer 751, a memory 752, the wireless module 753, and the antenna 754. The microcomputer 751 controls the wireless module 753 for wirelessly transmitting the transmission data while using the memory 752 as a storage area during the process. The microcomputer 751 controls operations of the sound IC 707 and the vibrator 704, based on the data received from the game apparatus body 5 by the wireless module 753 via the antenna 754. The sound IC 707 processes the sound data and the like transmitted from the game apparatus body via the communication section 75. Further, the microcomputer 751 actuates the vibrator based on, for example, the vibration data (for example, a signal for powering the vibrator 704 ON/OFF) transmitted by the game apparatus body 5 via the communication section 75.

Data from the controller 7 including an operation signal (key data) from the operation section 72, three-axial direction acceleration signals (X, Z, and Z axes direction acceleration data) from the acceleration sensor 701, and the process result data from the imaging information calculation section 74 are outputted to the microcomputer 751. The microcomputer 751 temporarily stores, in the memory 752, the respective data (key data, X, Y, and X axes direction acceleration data and process result data) as the transmission data which is to be transmitted to the wireless controller module 19. The wireless transmission from the communication section 75 to the wireless controller module 19 is performed periodically at a predetermined time interval. Since a game process is generally performed at a cycle of 1/60 sec., the wireless transmission needs to be performed at a cycle of a shorter time period. Specifically, the game process unit is 16.7 ms (1/60 sec.), and the transmission interval of the communication section 75 structured using the Bluetooth® technology is 5 ms. At the transmission timing to wireless controller module 19, the microcomputer 751 outputs the transmission data stored in the memory 752 as a series of operation information to the wireless module 753. The wireless module 753 uses, for example, the Bluetooth® technology to transmit the operation information representing an electric wave signal from the antenna 754 as a carrier wave signal of a predetermined frequency. Thus, the key data from the operation data 72 included in the controller 7, X, Y, and Z axes direction acceleration data from the acceleration sensor 701 and process result data from the imaging information calculation section 74 are transmitted from the controller 7. The wireless controller module 19 of the game apparatus body 5 receives the electric wave signal, and the game apparatus body 5 demodulates or decodes the electric wave signal to obtain the series of the operation signal information (the key data, the X, Y, and Z axes direction acceleration data, and the process result data). Based on the obtained operation information and the game program, the CPU 10 of the game apparatus body 5 performs the game process. In the case where the communication section 75 is structured using the Bluetooth® technology, the communication section 75 can also have a function of receiving transmission data which is wirelessly transmitted from other devices.

Next, an outline of a game played using the game apparatus body 5 of certain example embodiments will be described and then a process performed by the game apparatus body 5 will be described in detail. As shown in FIG. 8, the overall size of the controller 7 is small enough to be held by one hand of an adult or even a child. In order to play the game using the controller 7 in the game system 1, a player holds the controller 7 by one hand an waves the controller 7. For example, FIG. 8 shows that the player is holding the controller 7 and waving the controller 7 up and down or left and right. In such an operation of the player waving the controller 7 or changing the direction of the controller, the game apparatus body 5 analyzes an elapsed time after determination, made by the game apparatus body 5, of a moving direction or a redirected direction (hereinafter, simply referred to as the moving direction) of the controller 7, and the like. The moving direction and the elapses time are used to perform a game process.

For example, when the player tilts the controller 7 in a static manner, the operation information (specifically, the X, Y, and Z axes direction acceleration data) representing an attitude of the controller 7 in a static state is provided to the game apparatus body 5. On the other hand, when the player waves the controller 7 up and down or left and right, or when the player changes the direction of the controller 7, the operation information representing a dynamic state is provided from the controller 7 to the game apparatus body 5 in accordance with an acceleration and the centrifugal force applied at the time of accelerating in the moving direction, and an acceleration and the centrifugal force applied at the time of decelerating so as to stop the movement. The change in acceleration applied to the controller 7 cam be detected by the acceleration sensor 701, and therefore when the X, Y, and Z axes direction acceleration data outputted by the acceleration 701 is processed additionally, the attitude of the controller 7 in the static state and the moving directions of the controller 7 in the dynamic state can be calculated. Further, additional process performed by using two-axial (for example, the X and Y axes) directions acceleration data which is outputted by the acceleration sensor 701, whereby the attitude of the controller 7 in the static state and the moving direction of the controller 7 in the dynamic state relative to the two-dimensional direction can be calculated. In the description below, as a feature of the acceleration sensor 701, the acceleration sensor 701 outputs acceleration data indicative of an acceleration in precisely the opposite direction to the acceleration applied to the acceleration sensor 701 (that is, an actually accelerating direction or decelerating direction). That is, the acceleration sensor 701 outputs the acceleration data depending on an inertial force arising from the acceleration of the acceleration sensor 701. Further, the gravity acceleration, which is applied to the acceleration sensor 701 when the controller 7 is in a static state, is outputted as acceleration data in the same direction as the gravity direction.

FIGS. 9 to 13 are diagrams each illustrating an example of a game process or an information process performed in accordance with the above-described moving direction. As an exemplary game process, a process of moving an object displayed on the monitor 2 in accordance with the above-described moving directions (for example, changing a direction for receiving a volleyball in a virtual game space displayed in the monitor 2, swinging a sword in the virtual game spaced displayed in the monitor 2, cutting a substance situated in the virtual game space, moving a substance situated in the virtual game space or the like) is performed, or a sound is caused to be outputted from the speakers 2a provided to the monitor 2 or the speaker 706 provided to the controller 7 in accordance with the moving direction. Further, as an exemplary information process, which is different from the game process, a gesture of a browser displayed on a display screen (such as moving a window, closing a window, page scrolling, and the like) is performed.

For example, In FIG. 9, an arm object OBJ of a volleyball player character situated in a virtual game space is displayed. The player holds the controller 7 by two hands and controls the controller 7 as if the player receives a volleyball. In this case, when the direction of the controller 7 held by the two hands is changed, a direction of the arms of the arm object OBJ is also changed, in the virtual game space, in the direction corresponding to the changed direction of the controller 7 (the moving direction). As shown in FIG. 9, in accordance with a ball object B approaching from the right direction in the virtual game space, the player changes the direction of the controller 7 from left to right. In accordance with this change in the direction of the controller 7, the direction of the arms of the arm object OBJ changes from left to right, and the arm object OBJ receives the ball object B.

Further, as shown in FIG. 10, a sword object OBJ situated in a virtual game space is displayed on the monitor 2. When the controller 7 is waved, the sword object OBJ is swung, in the virtual game space, in the direction corresponding to the moving direction of the controller 7.

Figure 11A:
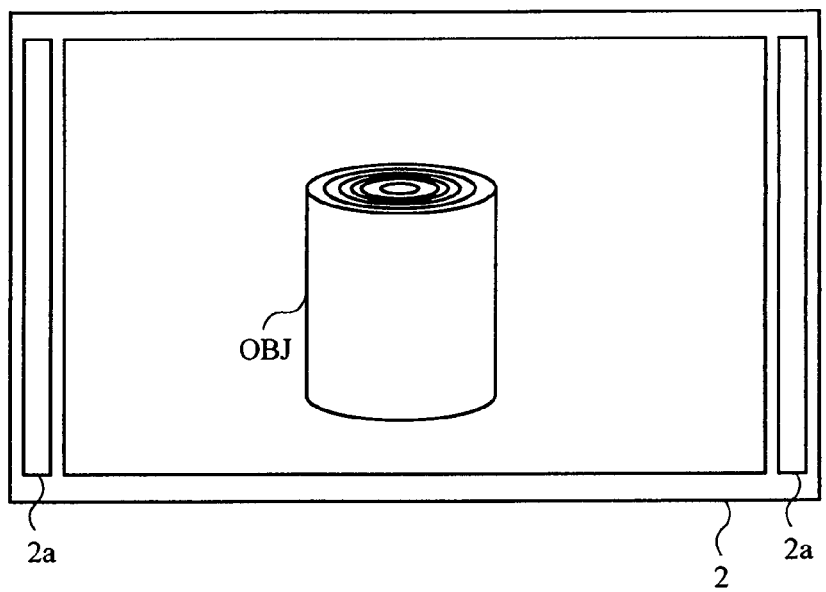
FIG. 11 is a diagram illustrating an object which is not cut in a third example of the game process or the information processing performed in accordance with the moving direction of the controller 7.
Figure 11B:
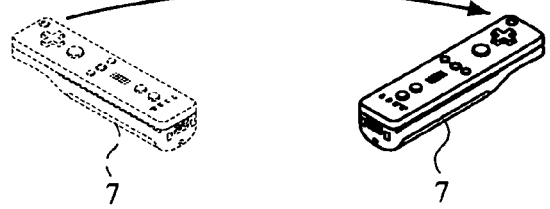

Further, in FIG. 11A, a log object OBJ situated in a virtual game space is displayed on the monitor 2. As shown in FIG. 11A, the log object OBJ is cut, in the virtual game space, along a direction corresponding to the moving direction of the controller 7, and divided and separated into log objects OBJ1 and OBJ2. In this case, although the log objects OBJ1 and OBJ2 are displayed in the monitor 2 as target materials having been cut in accordance with the moving direction, an object for cutting the target materials (for example, a cutting tool object such as a sword, a knife and an ax) need not be displayed on the monitor 2. For example, only a trail of the object for cutting the target materials, as indicated as a dashed arrow in FIG. 11B, may be displayed, or only a change in a movement of the target materials may be displayed.

Further, as shown in FIG. 12, a window W used by a browser or the like is displayed on the monitor 2. When the direction of the controller is changed, or when the controller is waved, the window W moves, in the display screen, to a direction corresponding to the moving direction of the controller 7.

Further, as shown in FIG. 13, when the direction of the controller 7 is changed, or when the controller 7 is waved, a sound is generated from the speakers 2a accommodated in the monitor 2. Various sounds are generated from the speakers 2a depending on the moving direction of the controller 7, or a sound is generated only from one of the speakers 2a depending on the moving direction.

As apparent from the below description, the elapsed time from the recognition of the moving direction can be used as a degree of reliability of the moving direction having been determined. For example, in an application in which a quick responsiveness is important, immediately after the elapsed time is updated to 0 (for example, at the movement the elapsed time is increased to 0), the game process, the information processing or the like can be performed by using the moving direction having been determined. On the other hand, in an application requiring that the moving direction be accurately determined, after the elapsed time is increased to a certain amount, the game process, the information processing or the like can be performed by using the moving direction having been determined.

Further, as apparent from the below description, with regard to the determination of the moving direction in the present embodiment, even if the controller 7 is waved weakly such that the direction of the controller 7 is changed slowly, the moving direction can be determined. Therefore, even in the case where the player holds the controller 7 by two hands and changes the direction of the controller 7, the moving direction of the controller 7 can be determined. Further, even in the case where the controller is waved by a child or an adult female who cannot wave the controller 7 vigorously, the moving direction can be determined accurately.

Figure 14:
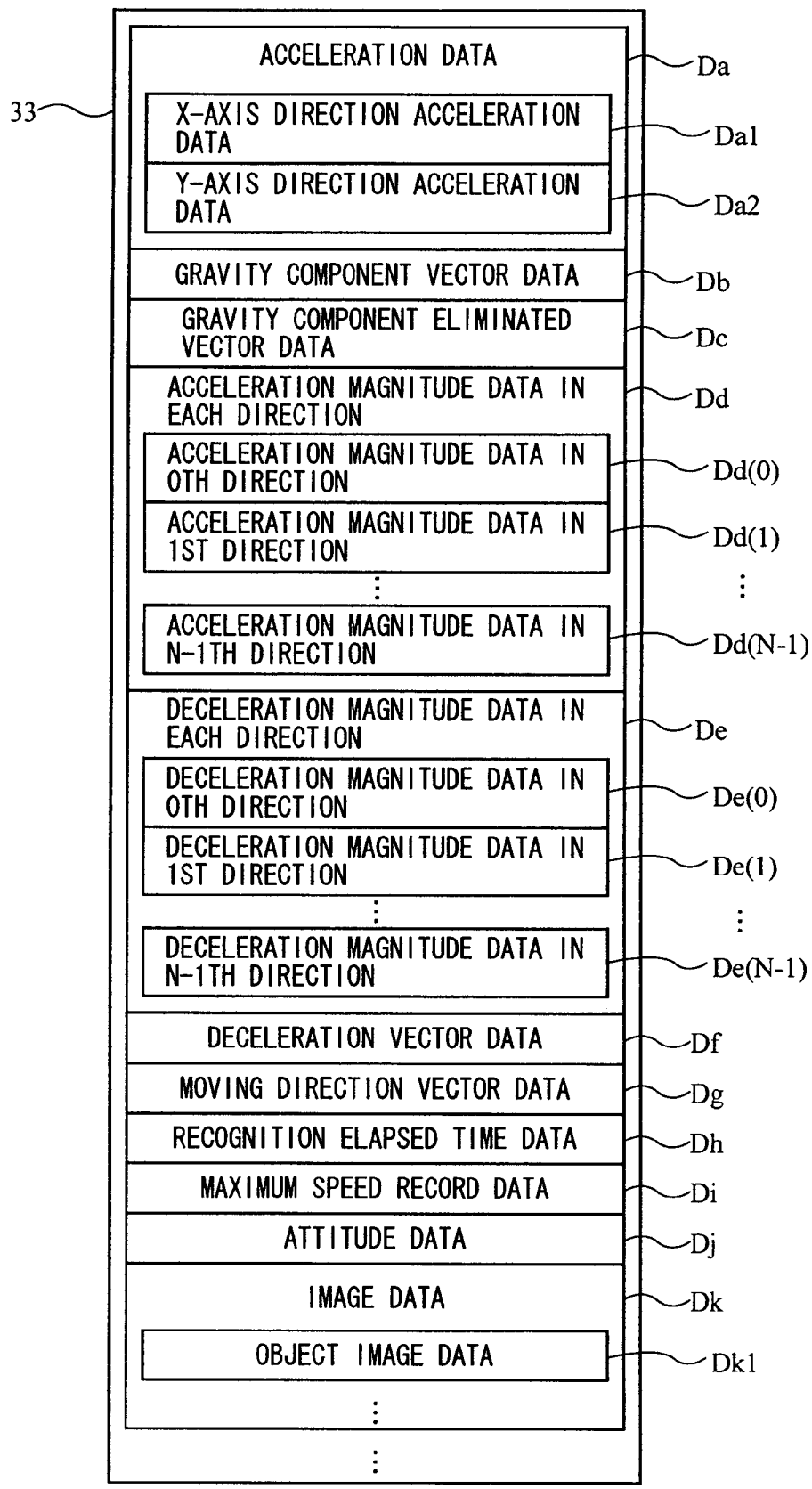
FIG. 14 is a diagram illustrating main data stored in a main memory of the game apparatus body 5.

Next, the game process performed by the game system 1 will be described in detail. Initially, with reference to FIG. 14, main data to be used for the game process will be described. FIG. 14 is a diagram illustrating main data to be stored in the external main memory 12 and/or the internal main memory 35 (hereinafter, collectively referred to as a main memory) of the game apparatus body 5.

As shown in FIG. 14, the main memory stores acceleration data Da, gravity component vector data Db, gravity component eliminated vector data Dc, acceleration magnitude data Dd in respective directions, deceleration magnitude data De in respective directions, deceleration vector data Df, moving direction vector data Dg, recognition elapsed time Dh, maximum speed record data Di, attitude data Dj, image data Dk and the like. The main memory also stores data necessary for the game process such as data relating to the object OBJ and other objects appearing in a game (positional data and the like) or data relating to a virtual game space (background data and the like), in addition to data included in the information shown FIG. 14.

The acceleration data Da represents and acceleration applied to the controller 7, and stores acceleration data included in the series of operation information transmitted by the controller 7 as the transmission data. The acceleration data Da includes X-axis direction acceleration data Da1 representing an acceleration component rX which is detected along an X-axis component by the acceleration sensor 701, and Y-axis direction acceleration data Da2 representing as acceleration component rY which is detected along a Y-axis component by the acceleration sensor 701. The wireless controller module 19 included in the game apparatus body 5 receives acceleration data contained in the operation information transmitted from the controller 7 at predetermined intervals (for example, every 1/200 sec.), and stores the acceleration data in a buffer (not shown) of the wireless controller module 19. Thereafter, most recent acceleration data stored in the buffer is read for each frame (for example, every 1/60 sec.) corresponding to a game process cycle so as to update the acceleration data Da in the main memory.

The above-described operation information includes the acceleration data which is detected along a Z-axis component by the acceleration sensor 701. However, in order to determine the moving direction based on the X-axis and Y-axis directions only, in an embodiment described hereinbelow, the acceleration data Da will include Z-axis direction acceleration data representing an acceleration component rZ which is detected along the Z-axis component by the acceleration sensor 701.

Although a process flow hereinbelow describes an example of the acceleration data Da being updated for every frame which corresponds to the game process cycle, the acceleration data Da may be updated in another process cycle. For example, the acceleration data Da may be updated for every transmission cycle of the controller 7, and the updated acceleration data may be used for every game process cycle. In this case, a cycle in which acceleration data Da1 and Da2 are stored in the acceleration data Da is different from the game process cycle.

The gravity component vector data Db stores vector data representing an acceleration of gravity component applied to the controller 7 (a gravity component vector). Specifically, the gravity component vector data Db stores data respectively representing an X-axis direction component gX and Y-axis direction component gY of the gravity component vector.

The gravity component eliminated vector data Dc stores vector data (gravity component eliminated vector) representing an acceleration applied to the controller from which the gravity component applied to the controller 7 has been eliminated. Specifically, the gravity component eliminated vector data Dc stores an X-axis direction component accX and a Y-axis direction component accY of the gravity component eliminated vector.

The acceleration magnitude data Dd for the respective directions stores data representing a magnitude of an acceleration applied to the controller 7 when the controller 7 is moved in a real space. Specifically, in order to analyze the moving direction, N directions (0th to N−1th directions) are set on an X, Y-axes plane, and an acceleration magnitude p(n) is calculated for each of the N directions (N-th direction). Data representing the acceleration magnitude p(n) calculated with respect to each of the 0th to N−1th directions is stored in acceleration magnitude data Dd (0) for the 0th direction to acceleration magnitude data Dd (N−1) direction, respectively, which are collectively included in the acceleration magnitude data Dd.

The deceleration magnitude data De for the respective directions stores data representing a magnitude of deceleration applied to the controller 7 when the controller 7 is moved in the real space. Specifically, the above-described 0th to N−1th directions are set, and deceleration magnitude m(n) is calculated for each of the N directions (N-th direction). Data representing the deceleration magnitude m(n) calculated for each of the 0th to N−1th directions is stored in deceleration magnitude data De (0) for the 0th direction to deceleration magnitude data De (N−1) for the N−1th direction, respectively, which are collectively included in the deceleration magnitude data De.

The deceleration vector data Df stores vector (deceleration vector) data representing a direction in which the controller 7 is decelerating and a magnitude of the deceleration thereof in the real space. Specifically, the deceleration vector data Df stores data representing an X-axis direction component sum X and Y-axis direction component sum Y of the deceleration vector.

The moving direction vector data Dg stores data representing a moving direction dir in which the controller is being moved. Specifically, the moving direction vector data Dg stores data representing the moving direction dir by a two-dimensional vector having a magnitude of 1. The recognition elapsed time Dh stores a recognition elapsed time c after the moving direction dir having been calculated. The maximum speed record data Di stores data representing a maximum value of deceleration vector magnitude in a series of processes (a maximum speed record Sp_max). The attitude data Dj stores data representing an attitude direction pos of the controller 7 in a static state. Specifically, a direction of the gravity acceleration applied on the X, Y-axes plane is regarded as the attitude directions pos, and the attitude data Dj stores data representing the attitude direction pos in a form of a two-dimensional vector having a magnitude of 1.

The image Dk includes object image data Dk1 and the like. The object image data Dk1 generates a game image by locating an object OBJ in a virtual game space.

Figure 15:
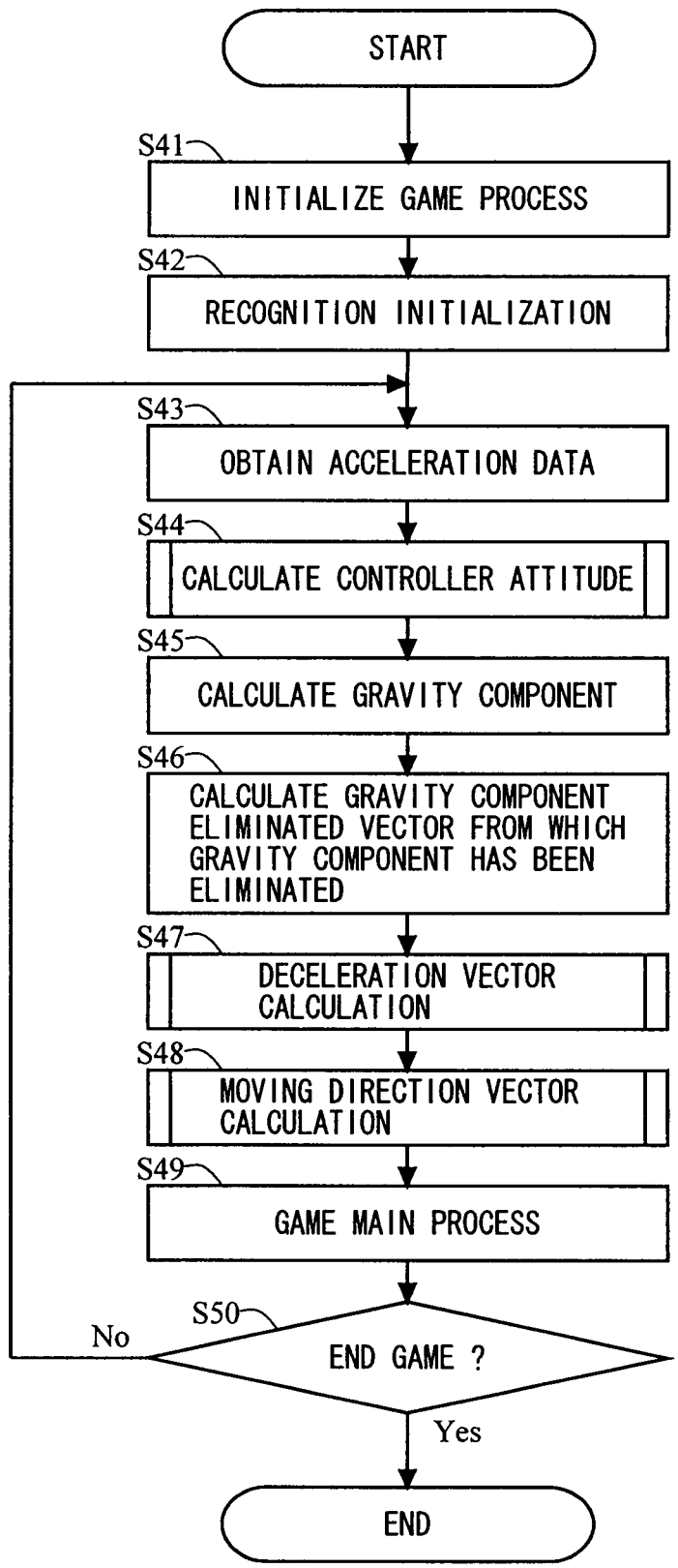
FIG. 15 is a flow chart illustrating a flow of the game process executed by the game apparatus body 5.
Figure 16:
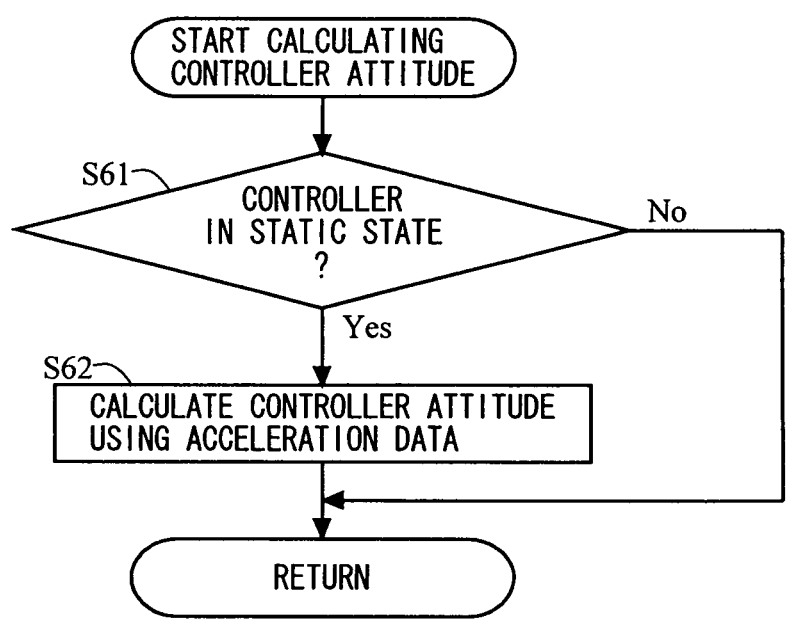
FIG. 16 shows a sub-routine illustrating in detail a process of calculating an attitude of the controller in step 44 shown in FIG. 15.
Figure 17:
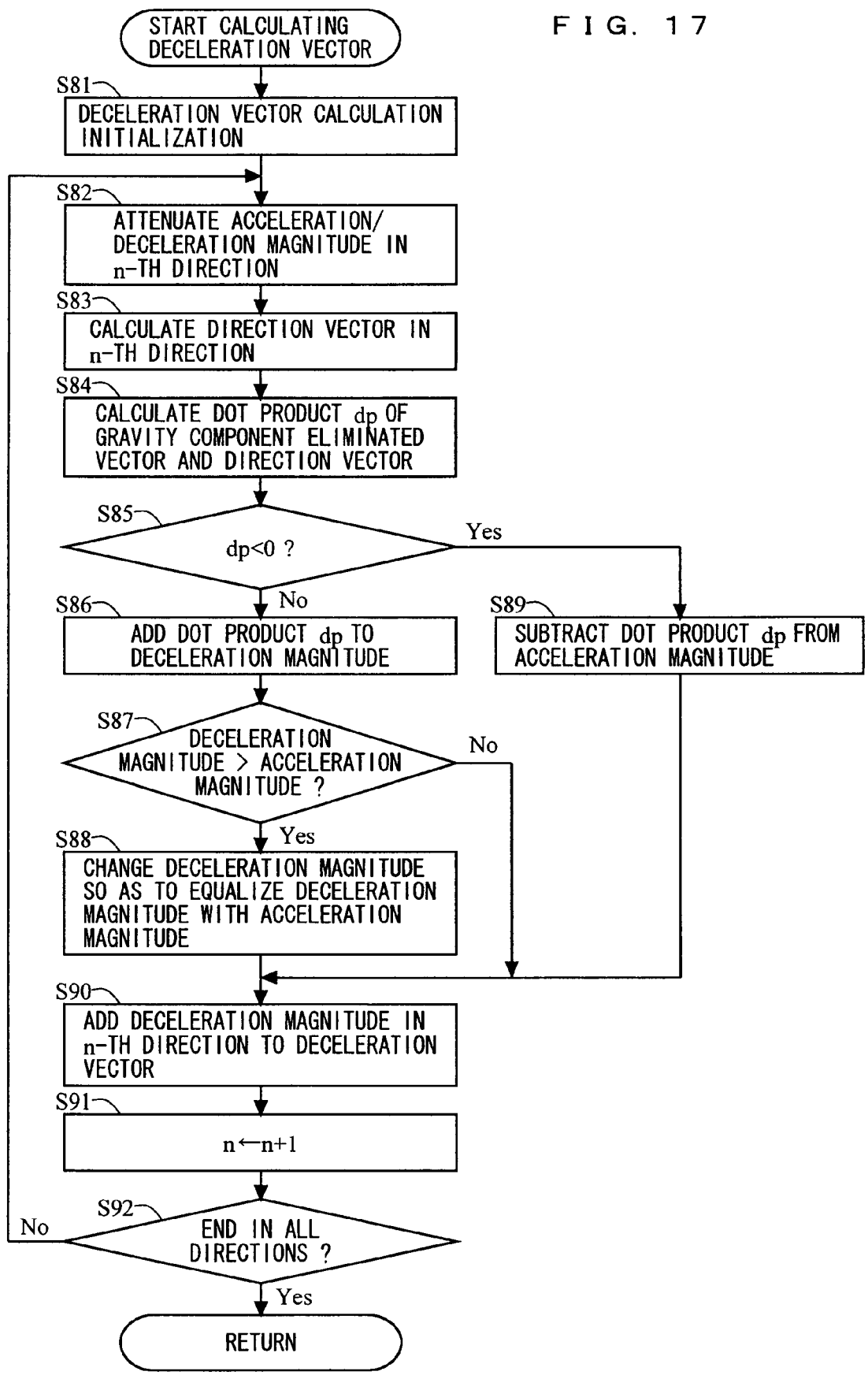
FIG. 17 shows a sub-routine illustrating in detail a process of calculating a deceleration vector in step 47 shown in FIG. 15.
Figure 18:
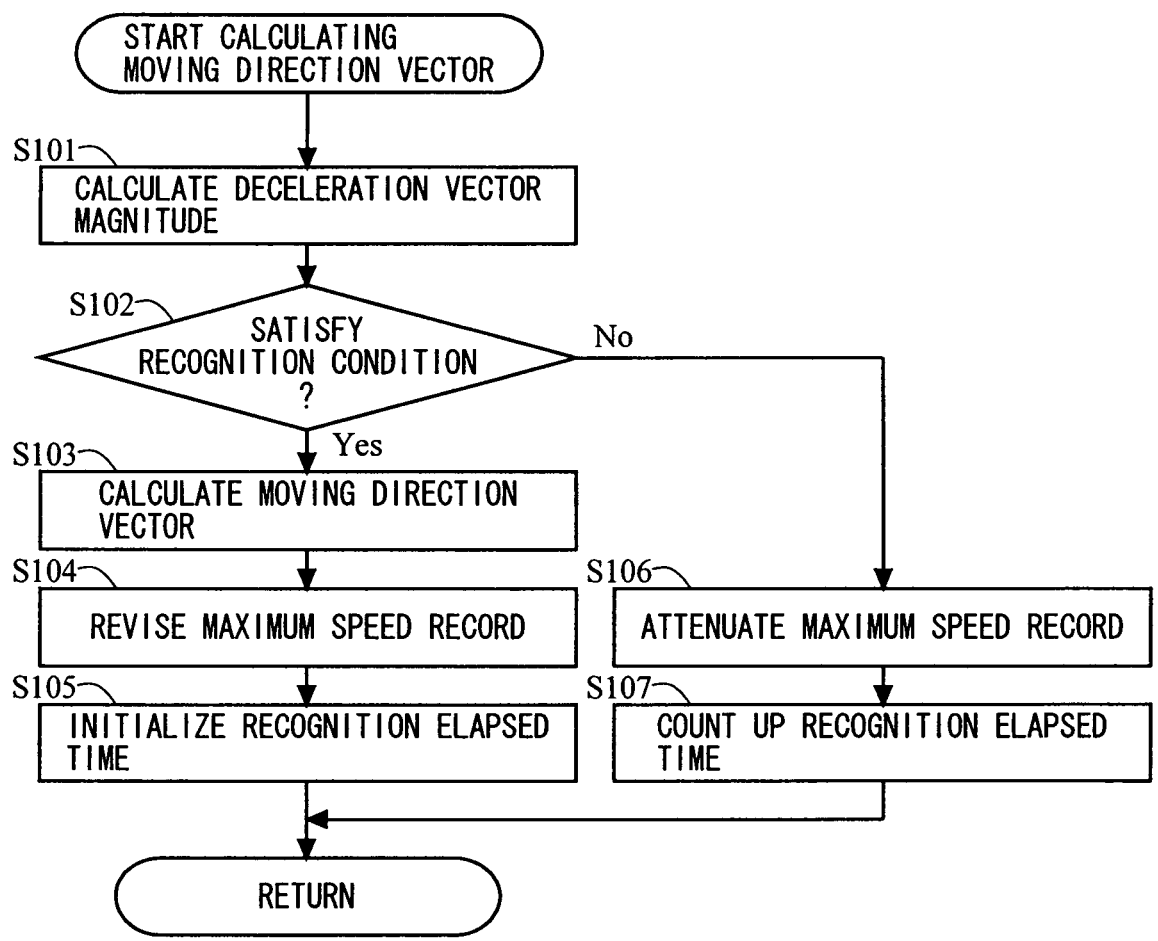
FIG. 18 shows a sub-routine illustrating in detail a process of calculating a moving direction vector in step 48 shown in FIG. 15.

Next, with references to FIGS. 15 to 18, the game process executed by the game apparatus body 5 will be described in detail. FIG. 15 is a flowchart illustrating a flow of the game process executed by the game apparatus body 5. FIG. 16 shows a sub-routing illustrating in detail a process of calculating the attitude of the controller in step 44 shown in FIG. 15. FIG. 17 shows a sub-routing illustrating in detail a process of calculating the deceleration vector in step 47 shown in FIG. 15. FIG. 18 shows a sub-routing illustrating in detail a process of calculating the moving direction vector in step 48 shown in FIG. 15. In the flowcharts as shown in FIGS. 15 to 18, among the game processes, a process of recognizing the moving direction in accordance with the player changing the direction of the controller 7 or waving the controller 7 will be described. In FIGS. 15 to 18, each of the steps executed by the CPU 10 is abbreviated as "S".

When the game apparatus body is powered on, the CPU 10 of the game apparatus body 5 executes a booting program stored in the ROM/RTC 13, thereby initializing the respective units such as the main memory. A game program stored in the optical disc 4 is ready by the main memory, and the CPU 10 starts executing the game program. The flowcharts shown in FIGS. 15 to 18 show the game process to be performed after completion of the above-described processes.

In FIG. 15, the CPU 10 initializes the game process (step 41), and proceeds to the next step. In initialization of the game process in above-described step 41, for example, in the case of a game process in which a direction of an arm of a game character is to be changed or a substance is to be moved in a virtual game space, initialization relating to setting of the virtual game space, location of game objects and the like are performed.

Next, the CPU 10 initializes a recognition process (step 42), and proceeds to the next step. In initialization of the recognition process in above-described step 42, respective parameters for calculating the moving direction of the controller 7 are initialized. For example, the CPU 10 sets the X-axis direction component gX and the Y-axis direction component gY of the gravity component vector stored in the gravity component vector data Db to 0, respectively. The CPU 10 sets X-axis direction component accX and the Y-axis direction component accY of the gravity component eliminated vector stored in the gravity component eliminated vector data Dc to 0, respectively. The CPU 10 sets the acceleration magnitude p(n) to 0, the acceleration magnitude p(n) being stored in each of the acceleration magnitude data Dd0 in the 0th direction to the acceleration magnitude data Dd (N−1) in the N−1th direction. The CPU 10 sets the deceleration magnitude m(n) to 0, the deceleration magnitude m(n) being stored in each of the deceleration magnitude data De0 for the 0th direction to the deceleration magnitude data De (N−1) for the N−1th direction. The CPU 10 sets the X-axis direction component sumX and the Y-axis direction component sumY of the deceleration vector stored in the deceleration vector data Df to 0, respectively. The CPU 10 sets each of the moving direction dir and the attitude direction pos, which are stored in the moving direction vector data Dg and the attitude data Dj, respectively, to a two-dimensional vector which has a length of 1 and is oriented in a predetermined direction. The CPU 10 sets the maximum speed record Sp_max stored in the maximum speed record data Di to 0. The CPU 10 then sets the recognition elapsed time c stored in the recognition elapsed time data Dh to 0.

Next, the CPU 10 obtains the acceleration component rX and the acceleration component rY (step 43) and proceeds to the next step. For example, the CPU 10 stores an acceleration, which is represented by the acceleration data included in most recent operation information received from the controller 7, as the acceleration component rX and the acceleration component rY in the acceleration data Da. Specifically, the acceleration represented by the X-axis direction acceleration data included in the most recent operation information received from the controller 7 is stored in the X-axis direction acceleration data Da1 as the acceleration component rX. The acceleration represented by the Y-axis direction acceleration data included in the most recent operation information is stored in the Y-axis direction acceleration data Da2 as the acceleration component rY.

Next, the CPU 10 calculates the attitude of the controller 7 (step 44), and then proceeds to the next step. Hereinafter, with reference to FIG. 16, the attitude calculation process relating to the controller 7, which is performed in above-described step 44, will be described.

In FIG. 16, the CPU 10 determines whether or not the controller 7 is in a static state or not, with reference to the acceleration component rX and the acceleration component rY stored in the acceleration data Da (step 61). As an example, the CPU 10 determines that the controller 7 is not in the static state in the case where a value of either of the acceleration component rX and the acceleration component rY is equal to or more than a value corresponding to the gravity acceleration. As another example, in the case where variation in each of the acceleration component rX and the acceleration component rY is smaller than a predetermined value, the controller 7 is determined to be in the static state. There may be other methods for determining, with reference to the acceleration component rX and the acceleration component rY, whether or not the controller 7 is in the static state, and such other methods may be applied in above-described step 61 for determining the state of the controller 7. The CPU 10 proceeds to the next step 62 in the case where the controller 7 is in the static state. On the other hand, the CPU 10 ends the process of the sub-routine in the case where the controller 7 is not in the static state.

In step 62, the CPU 10 calculates the attitude direction pos by using the acceleration component rX and the acceleration component rY, stores the calculated attitude direction pos in the attitude data Dj, and then ends the process of the sub-routine. In the case where the controller 7 is in the static state, the gravity acceleration is applied to the controller 7. The direction (the attitude direction pos) in which the gravity acceleration is applied to the controller 7 can be calculated, based on the values of the acceleration component rX and the acceleration component rY, as a two-dimensional vector having a magnitude of 1. For example, in the case of the acceleration component rX=1G and the acceleration component RY=0, it is possible to determine that the controller 7 is left at rest horizontally while a right side surface of the controller 7 is facing upward. Accordingly the attitude direction pos is in the X-axis positive direction. In the case of the acceleration component rX=0 and the acceleration component rY=−1G it is possible to determine that the controller 7 is left at rest horizontally (in a state of FIG. 3) while the top surface (a surface on which the cross key 72a is provided) of the controller 7 is facing upward. Accordingly the attitude direction pos is in the Y-axis negative direction. Further in the case of the acceleration component rX=0 and the acceleration component rY=0, it is possible to determine that the controller 7 is left at rest while the front surface of the controller 7 is facing upward or downward, that is, the controller 7 is left at rest vertically, and thus the attitude direction pos is either in the X-axis positive direction or in the Z-axis negative direction.

In the case where three-dimensional acceleration data constituted of the acceleration component rX, the acceleration component rY, and the acceleration component rZ is stored in the acceleration data Da, it is possible to determine the attitude of the controller 7 more accurately. In this case, it is possible to obtain a three-dimensional vector having a magnitude of 1, which represents a vertically downward direction relative to the X, Y, Z-axes directions defined for the controller 7, as the attitude direction pos. For example, the CPU 10 stores the three-dimensional attitude direction pos, which represents the direction of the gravity acceleration applied to the controller 7, in the attitude data Dj.

Returning to the FIG. 15, after the attitude of the controller 7 in step 44, the CPU 10 calculates the gravity component applied to the controller 7 (step 45), and proceeds to the next step. For example, the CPU 10 refers to the acceleration component rX and the acceleration component rY which are stored in the acceleration data Da, and X-axis direction component gX and Y-axis direction component gY of the gravity component vector which are stored in the gravity component vector data Db. The CPU 10 then calculates a new x-axis direction component gX and a new Y-axis direction component gY, respectively, as follow, and then updates the gravity component vector data Db.

$$gX \leftarrow gX + (rX - gX) * K$$

$$gY \leftarrow gY + (rY - gY) * K$$

Here, K represents a tracking coefficient, and is set as K=0.0075, for example. Based on the above-described equations, as a gravity component vector (gX, gY), and acceleration component constantly applied to the controller 7 is extracted from the acceleration component rX and the acceleration component rY applied to the controller 7. Therefore, the gravity component vector (gX, gY) is a parameter representing the gravity component applied to the controller 7.

Next CPU 10 calculates an acceleration component from which the gravity component has been eliminated (the gravity component eliminated vector) (step 46), and proceeds to the next step. For example, the CPU 10 refers to the acceleration component rX and the acceleration component rY each stored in the acceleration data Da, and the X-axis direction component gX and the Y-axis direction gY of the gravity component vector each stored in the gravity component vector data Db. The CPU 10 calculates an X-axis direction component accX and Y-axis direction accY of a new gravity component eliminated vector in accordance with equations as indicated below, and updates, the gravity component eliminated vector data Dc.

$$accX = rX - gX$$

$$accY = rY - gY$$

As apparent from the above-described equations, the gravity component eliminated vector (accX, accY) is an acceleration component which is obtained by eliminating the gravity component (that is, the gravity component vector (gX, gY)) from the acceleration component rX and acceleration component rY which are applied to the controller 7, and also corresponds to a parameter indicating an acceleration component exerted when a player moves the controller 7.

Next, the CPU 10 calculates the deceleration vector (step 47), and proceeds to the next step. Hereinafter, with reference to FIG. 17, a process of calculating the deceleration vector performed in above-described step 47 will be described.

In FIG. 17, the CPU 10 performs initialization in the process of calculating the deceleration vector (step 81), and proceeds to the next step. For example, the CPU 10 initializes a loop counter n to 0. The CPU 10 also sets the X-axis direction component sumX and Y-axis direction component sumY, which are each stored in the deceleration vector data Df, to 0, respectively.

Next, the CPU 10 attenuates the acceleration magnitude p(n) and the deceleration magnitude m(n) in the n-th direction (step 82), and proceeds to the next step. Here, as shown in FIG. 19, N direction, which are different from one another, are arranged at intervals of a uniform angle on the X, Y-axes plane for determining the moving direction dir. In an example as shown in FIG. 19, N=16 directions are arranged at intervals of 22.5°, and n=0 to 15 are allocated to each of the directions. Among the directions, the 0th (n=0) is set as an X-axis positive direction, and the fourth direction (n=4) is set as a Y-axis positive direction. In above described step 82, the CPU 10 calculates a new acceleration magnitude p(n) and a new deceleration magnitude m(n) in the n-th direction based on equations as indicated below, and updates the acceleration magnitude data Dd (n) and the deceleration magnitude data De (n) with respect to the n-th direction.

$$p(n) \leftarrow p(n)*DAMP$$

$$m(n) \leftarrow m(n)*DAMP$$

Here, DAMP represents an attenuation coefficient, and is set as DAMP=0.95, for example.

Next, the CPU 10 calculates a direction vector having a length of 1 which represents the n-th direction (step 83), and proceeds to the next step. Specifically, as shown in FIG. 19, and angle deg formed by the X-axis positive direction and the n-th direction is calculated as follows.

$$deg = 360*n/N$$

An X-axis component vecX and Y-axis component vecY of the direction vector which represent the n-th direction are respectively calculated based on equations as indicated below.

$$vecX = \cos(deg)$$

$$vecY = \sin(deg)$$

Next, the CPU 10 calculates a dot product dp of the gravity component eliminated vector (accX, accY) and the direction vector (vecX, vecY) (step 84), and proceeds to the next step. Specifically, the dot product dp is calculated as follows.

$$dp = accX*vecX + accY*vecY$$

Based on the dot product dp, a n-th direction component in the gravity component eliminated vector (accX,accY) can be calculated.

Next, the CPU 10 determines whether or not the dot product dp is a negative value (step 85). The dot product dp, which has been calculated in above-described step 84, indicates the n-th direction component of the gravity component eliminated vector (accX, accY). On the other hand, as above described, the acceleration data outputted by the acceleration sensor 701 represents an acceleration in a direction precisely opposite to an acceleration applied in accordance with the movement of the controller 7 (i.e., a direction in which the controller 7 is actually accelerating or decelerating). That is, in the case where the dot product dp represents a positive value, a negative acceleration is applied in the n-th direction (for example, the controller is moving in the n-th direction at a decelerated rate, or moving in a direction opposite to the n-th direction at an accelerated rate). Further, in the case where the dot product dp represents a negative value, a positive acceleration is applied in the n-th direction (for example, the controller is moving in the n-th direction at an accelerated rate, or moving to a direction opposite to the n-th direction at a decelerated rate). In the case of dot product dp<0, the CPU 10 proceeds to the next step 90. On the other hand, in the case of dot product dp>=0, the CPU 10 proceeds to next step 86.

In step 86, the CPU 10 adds the dot product dp to the deceleration magnitude m(n) in the n-th direction, and proceeds to the next step. Specifically, the CPU 10 calculates a new deceleration magnitude m(n) in the n-th direction as follows, and updates the deceleration magnitude data De(n) with respect to the n-th direction.

$$m(n) \leftarrow m(n) + dp$$

Next, the CPU 10 determines whether or not the deceleration magnitude m(n) in the n-th direction is larger than the acceleration magnitude p(n) in the n-th direction (step 87). In a case m(n)>p(n), the CPU 10 changes the deceleration magnitude m(n) so as to equalize the deceleration magnitude m(n) with acceleration magnitude p(n) (step 88), and proceeds to the next step 90. Specifically, in step 88, the CPU 10 sets and follows.

$$m(n) \leftarrow p(n)$$

The CPU 10 then updates the deceleration magnitude data De (n) in the n-th direction. In step 88, the deceleration magnitude m(n) in the n-th direction is restricted so as not to exceed the acceleration magnitude p(n) in the n-th direction, and therefore, the deceleration magnitude m(n) is added in the case where the acceleration is applied immediately before deceleration. That is, acceleration and deceleration in a given direction of the controller 7 is processed as a set.

On the other hand, in above-described step 85, in the case where it is determined that the controller 7 is accelerating in the n-th direction, the CPU 10 subtracts the dot product dp from the acceleration magnitude p(n) in the n-th direction step 89), and proceeds to next step 90. Specifically, the CPU 10 calculates a new acceleration magnitude p(n) in the n-th direction as follows, and updates the acceleration magnitude data Dd(n) with respect to the n-th direction.

$$p(n) \leftarrow p(n) - dp$$

Here, as above described, when the controller 7 is accelerating in the n-th direction, the dot product dp represents a negative value. Therefore, to the acceleration magnitude p(n), an absolute value of the dot product dp is added, in the event.

In step 90, the CPU 10 adds the deceleration magnitude m(n) in the n-th direction to the deceleration vector, and proceeds to the next step. For example, the CPU 10 refers to the X-axis direction component sumX and the Y-axis direction component sumY of the deceleration vector each stored in the deceleration vector data Df. The CPU 10 calculates a new X-axis direction component sumX and a new Y-axis direction component sumY, respectively, based on equation indicated as below, and updates the deceleration vector data Df.

$$sumX \leftarrow sumX + vecX*m(n)$$

$$sumY \leftarrow sumY + vecY*m(n)$$

Next, the CPU 10 adds 1 to the loop counter n (step 91), and determines whether or not the process has been completed with respect to all the directions, that is, n=N (step 92). In the case where the process has been completed with respect to all the directions, the CPU 10 ends the process of the sub-routine. On the other hand, in the case where the process has not been completed with respect to all the direction, the CPU 10 returns to above-described step 82, and repeats the process.

Returning to FIG. 15, after calculating the deceleration vector in above-described step 47, the CPU calculates the moving direction vector (step 48), and proceeds to the next step. Hereinafter, with reference to FIG. 18, the calculation of the moving direction vector performed in above-described in step 48 will be described.

In FIG. 18, the CPU 10 calculates a deceleration vector magnitude Sp (step 101), and proceeds to the next step. For example, the CPU 10 refers to the X-axis direction component sumX and the Y-axis direction component sumY, stored in the deceleration vector data Df, and calculates the deceleration vector magnitude Sp based on equation 1.

$$Sp = \sqrt{sumX^2 + sumY^2} \qquad \text{[Equation 1]}$$

Next, the CPU 10 determines whether or not the calculated deceleration vector magnitude Sp satisfies a recognition condition for recognizing the moving direction (step 102). For example, in the case where the deceleration vector magnitude Sp calculated in above-described step 101 is larger than the maximum speed record Sp_max described later, and in the case where the magnitude Sp is equal to or larger than a predetermined value, the same deceleration vector magnitude Sp is determined to satisfy the recognition condition. Here, the above-described predetermined value is a minimum deceleration vector magnitude necessary to recognize the moving direction dir, and is set to 0.5, for example. In the case where the recognition condition is satisfied, the CPU 10 proceeds to the next step 103. On the other hand, in the case where the recognition condition is not satisfied, the CPU 10 proceeds to the next step 106.

In step 103, the CPU 10 calculates a current direction of the deceleration vector as the moving dir, and proceeds to the next step. For example, the CPU 10 calculates a two-dimensional vector having a length of 1, which is obtained by normalizing the deceleration vector (sumX, sumY), stored in current deceleration vector data Df, and updates the moving direction vector data Dg by setting the two-dimensional vector as the moving direction dir.

Next, the CPU 10 updates the maximum speed record data Di by setting the deceleration vector magnitude Sp, which has been calculated in above-described step 101, as the maximum speed record Sp_max (step 104). The CPU 10 initializes the recognition elapsed time c to 0, updates the recognition elapsed time Dh (step 105), and ends the process of the sub-routine.

On the other hand, in the case where it is determined that the recognition condition is not satisfied in the above-described step 102, the CPU 10 attenuates the maximum speed record Sp_max by a predetermined amount, updates the maximum speed record data Di (step 106), and then proceeds to the next step. For example, with reference to the maximum speed record Sp_max stored in current maximum speed record data Di, the CPU 10 calculates a new maximum speed record Sp_max by multiplying the maximum speed record Sp_max by a predetermined attenuation coefficient (which is a positive value smaller than 1, and is, for example, 0.98) thereby updating the maximum speed record data Di.

Next, the CPU 10 counts the recognition elapsed time c (step 107), and ends the process of the sub-routine. For example, the CPU 10 adds 1 to the recognition elapsed time c stored in the recognition elapsed time data Dh, thereby updating the recognition elapsed time c. That is, the recognition elapsed time c is such parameter that is initialized to 0 when the moving direction dir is calculated in above-described step 105, and is updated when the determination condition is not satisfied.

Returning to FIG. 15, after calculation of the moving direction vector in above-described step 48, the CPU 10 executes a game main process (step 49), and then proceeds to the next step. The CPU 10 is capable of executing the game main process by using the moving direction dir, the recognition elapsed time c and the attitude direction pos, respectively calculated in the processes of above-described steps 41 to 48. For example, in the game main process, an object is moved in a virtual game space (for example, a direction of an arm of an object character is changed, a sword is swung, a substance is moved or the like) in accordance with the moving direction dir, or a sound is generated from the speakers 2a or the speaker 706 included in the controller 7 in accordance with the moving direction dir.

Next the CPU 10 determines whether or not to end a game (step 50). For example, as a condition for ending the game, a case where a condition for game over is satisfied, a case where a player has performed an operation for ending the game or the like is considered. The CPU 10 returns to above-described step 43 so as to repeat the process in the case where the game is not ended. On the other hand, the CPU 10 ends the process of the flowchart in the case where the game is ended.

Figure 20:
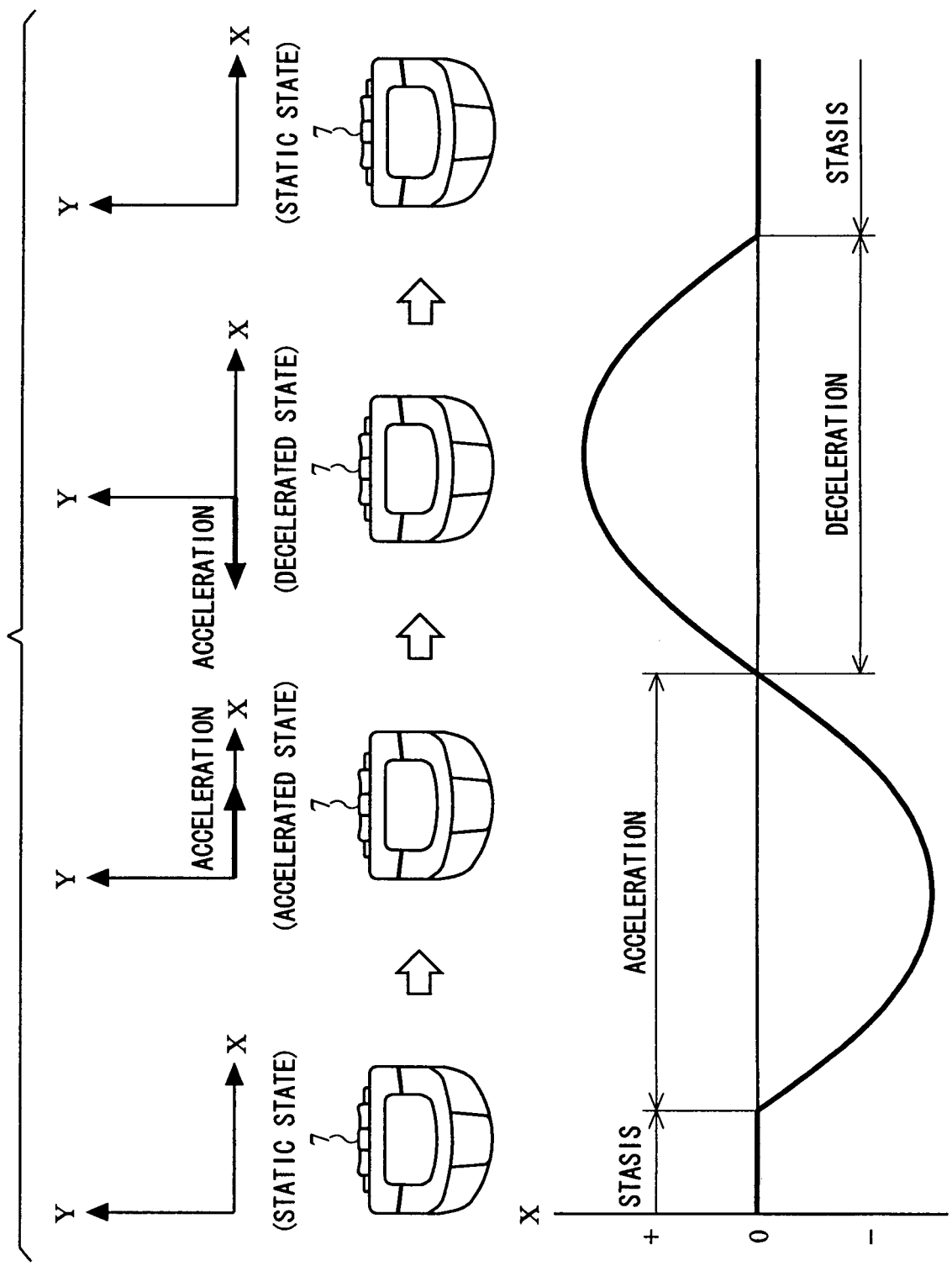
FIG. 20 is a diagram illustrating an example in which the controller 7 is moved in an X-axis positive direction from a static state and is then stilled again.

Here, a basic principle in the above-described acceleration data process will be described. As shown in FIG. 20, in the case where the controller 7 is moved in the X-axis positive direction from a static state, and then stilled again, an acceleration along the X-axis positive direction is applied (an accelerated state) to the controller 7, and then an acceleration along the X-axis negative direction is applied (a decelerated state) to the controller 7. On the other hand, the acceleration sensor 701 embedded in the controller 7 outputs acceleration data precisely opposite to the acceleration applied to the acceleration sensor 701. Therefore, in the case where the controller 7 is moved to the X-axis positive direction from a static state, and then stilled again, the acceleration sensor 701 outputs acceleration data representing the acceleration along the X-axis negative direction, and then outputs acceleration data representing the acceleration along the X-axis positive direction. In addition to the acceleration in accordance with the above-described movement of the controller 7, the gravity acceleration is applied constantly to the controller 7. However, the gravity acceleration will be omitted for the sake of simple description.

Here, in the case where the moving direction dir is determined by focusing the acceleration along the X-axis positive direction only, it is difficult to distinguish the acceleration along the X-axis positive direction from the deceleration which is applied after the controller 7 is moved and accelerated to the X-axis negative direction. Therefore, it is difficult to improve a detection accuracy of the moving direction dir. On the other hand, in the above-described embodiment, not only the above-described acceleration, but also the deceleration applied immediately after the acceleration is considered in a combined manner, whereby the deceleration is specified, and the moving direction dir is recognized.

For example, in the above-described embodiment, positive variables are set by accumulating a magnitude of a positive acceleration and a magnitude of a negative acceleration, respectively, which are applied in a predetermined direction, and the positive variables are each attenuated at a predetermined rate. The both variables are controlled such that one of the variables will not exceed another of the variables so as to consider an acceleration and a deceleration applied immediately thereafter as a set, whereby the one of the variables is specified as such that represent the deceleration. It may be assumed that the larger the variable of the deceleration in a predetermined direction is, the higher the possibility that the controller 7 has been waved to the predetermined directions is. Determination focusing on the deceleration, as described above, is performed with respect to a plurality of directions (16 directions in the present embodiment, as shown in FIG. 19), and the determination is summed, whereby a deceleration vector at the time point is calculated. For example, as shown in FIG. 20, a deceleration vector along the X-axis positive direction is calculated, whereby the moving direction dir in the X-axis positive direction is determined. In this manner, the moving direction dir is recognized by focusing on the deceleration applied immediately after the acceleration, whereby distinction between the acceleration and the deceleration can be performed accurately. Accordingly, the detection accuracy of the moving direction dir can be improved. Therefore, the above-described moving direction dir can be recognized even in the case when the controller is waved weakly such as the case where the direction of the controller 7 is changed slowly.

The deceleration vector is a virtual two-dimensional vector, which is constantly attenuated (see step 82), and the deceleration vector magnitude Sp is increased by accumulating the deceleration magnitude m(n) (see step 90). When the deceleration vector magnitude Sp reaches a predetermined value or more, a direction of the deceleration vector is recognized as the moving direction dir. That is, since the deceleration vector is constantly attenuated, it is necessary to continuously accumulate an acceleration of a deceleration applied in a single direction so as to keep the deceleration vector magnitude Sp equal to or more than the above-described predetermined value. The accumulated value is obtained from the acceleration data outputted by the acceleration sensor 701, and thus when the acceleration of the deceleration detected by the acceleration sensor 701 continues in a uniform trend, the moving direction dir is recognized. In this manner, a case where the acceleration of the deceleration continues in a uniform trend tends to occur at the time of deceleration while the acceleration sensor 701 (that is, the controller 7) is being moved linearly. Specifically, when a linear movement is given to the acceleration sensor 701, the acceleration and the acceleration of the deceleration detected by the acceleration sensor 701 change each in a linear direction, and thus the acceleration of the deceleration stays in a uniform trend. That is, in the above-described process, when the player moves the controller 7 linearly, the moving direction dir corresponding to the movement is likely to be recognized easily.

Further, in the above-described steps 102 and 106, based on a comparison between the maximum speed record Sp_max, which attenuates constantly at a predetermined rate, and the deceleration vector magnitude Sp obtained most recently, the recognition condition is set. For example, when the maximum speed record Sp_max is initialized to an extremely small value immediately after the moving direction dir is calculated, as small movement of the controller 7 performed after calculating the moving direction dir is recognized, and thus possibility of misrecognition will increase. For example, a movement performed so as to stop a movement of the controller 7 after the controller 7 is waved widely will be recognized, and thus is considered that an unstable movement such as jiggling of a player's hand, which is different from the moving direction of the controller rendered by the player, is misrecognized. On the hand, in the case where the maximum speed record Sp_max having been updated is kept as it is for a long time period, in order to calculate a new moving direction dir, it is necessary to obtain deceleration vector which allows the deceleration vector magnitude Sp to exceed the kept maximum speed record Sp_max. That is, it is necessary to decelerate the controller 7 after moving the controller 7 at a moving speed faster than the previously recognized and, and consequently appropriate recognition will be come impossible. In the above-described step 106, on the other hand, the maximum speed record Sp_max is multiplied by a positive value, which is close to and smaller than 1 (e.g. 0.98), as an attenuation rate, and thus it is possible to recognized a subsequent movement of the controller 7 without frequently recognizing the unstable movement as described above. Accordingly, it is possible to recognized the moving direction accurately and stably.

In the game main process in above-described step 49, the parameters obtained in the above-described acceleration data process can be used in various manners. As a first example, by using the moving direction dir, it is possible to estimate to which direction a player moves the controller 7, relative to the coordinate axes defined for the controller 7 (see FIGS. 3 and 4). For example, when the moving direction dir is used, it is possible to infer in which direction, relative to a body of the controller 7, the controller 7 is moved (for example, a top surface direction or a front surface direction of the controller 7). In this manner, the moving direction relative to the body of the controller 7 can be used for the game main process.

As a second example, when the moving direction dir and the recognition elapsed time c is used, the game main process can be performed based on a degree of reliability of the calculated moving direction dir. As apparent from the above-described process, the recognition elapsed time c is a parameter which is initialized to 0 when a new moving direction dir ic calculated. That is, the recognition elapsed time c is initialized each time a direction in which a player waves the controller 7 changes. Generally, when the player waves the controller 7 to a first direction, the player tends to move the controller 7 to the direction opposite to the first direction immediately before the player waves the controller 7 to the first direction (a so-called taking-back action). When the taking back action is applied to the controller 7, the moving direction dir representing the direction opposite to the above-described first direction is calculated during the taking-back action being performed, and then the moving direction dir representing the above-described first direction is calculated. In order to prevent the recognition of the taking-back action or the like which is unintendedly performed by the player, it is preferable to allow a certain amount of time to elapse after the moving direction dir is calculated. That is, in a game in which a quick response is important when the controller 7 is waved, the game main process can be performed, by using the calculated moving direction dir, at the moment the recognition elapsed time c is increased from 0, for example. In a game in which the moving direction dir is required to be more accurate when the controller 7 is waved, the main game process can be performed by using the moving direction dir which is calculated when the recognition elapsed time c reaches a given count or more.

As a third example, when the moving direction dir and the attitude direction pos is used, it is possible to infer a direction in which the player is moving the controller 7 in a real space in which a player is operating the controller 7. For example, as above described, when the moving direction dir is used, it is possible to infer the direction in which the controller 7 is waved, relative to the body of the controller 7. On the other hand, the attitude direction pos represents a direction of the gravity acceleration applied to the controller 7 at the time point prior to the player moving the controller 7 or the like, and also represents data indicating the vertically downward direction in the real space relative to the body of the controller 7. Therefore, when the moving direction dir and the attitude direction pos is used, it is possible to infer the direction in which the controller 7 is waved in the real space (for example, a horizontal direction, up-down direction and the like in the real space). Further, when a basic attitude or a direction for operating the controller 7 is set (for example, directing the front surface of the controller 7 to the monitor 2, or directing one side surface of the controller 7 to the monitor 2 while the controller 7 being held transversely, such that the controller 7 points to the monitor 2), it is possible to infer the direction such as an up-down direction, a right-left direction and a front-rear direction, in which the player wave the controller 7. Further, when the recognition elapsed time c is used, it is apparent that the game main process can be performed based on the degree of the reliability of the moving direction dir as with the above-described case. Still further, in the case of calculating the moving direction dir in the above-described step 103, it is possible to calculate a direction in which the controller 7 is being waved in the real space by using the attitude direction pos (that is, to calculate a moving direction of the controller 7 relative to the vertically downward direction), and to update the moving direction vector data Dg by using the calculated direction as the moving direction dir.

Further, the above-described attitude pos may be replaced with the gravity component vector (gX, gY). As above-described, the gravity component vector (gX, gY) is a parameter representing an acceleration component constantly applied to the controller 7, among the acceleration components rX and rY which are applied to the controller 7. The gravity component vector (gX, gY) can be used as a direction of the gravity acceleration applied to the controller 7. On the other hand, the attitude direction pos is a parameter represented by a two-dimensional vector having a magnitude of 1 which represents a direction of the gravity acceleration applied to the controller 7 in a static state on the X, Y-axes plane. Accordingly, the two-dimensional vector having the magnitude of 1 which represents the direction of the gravity component vector (gX, gY) is calculated, whereby the two-dimensional vector can be used in the same manner as the above-described attitude direction pos. In this case, the process of step 44 as shown in FIG. 15 is not required.

In this manner, the game apparatus 3 according to the above-described embodiment uses the deceleration vector obtained from the acceleration detected by the controller 7 including the acceleration sensor 701, thereby highly accurately determining a direction in which the controller 7 is moved and waved while the recognizing the direction in which the controller 7 is moved and waved with and enhanced responsiveness.

In the above-described acceleration data process, although the moving direction dir and the attitude direction pos of the controller 7 are recognized by the two-dimensional vector, the moving direction dir and the attitude direction pos in which the controller 7 has been waved may be obtained by using a three-dimensional vector. In this case, the operation information obtained from the controller 7 includes the acceleration data detected in the Z-axis component by the acceleration sensor 701, and an acceleration component rZ detected in a Z-axis component is also stored in the above-described acceleration data Da. Further, although the plurality of directions (i.e. 0th direction to N−1th direction), with respect to which acceleration/deceleration is evaluated so as to calculate the above-described deceleration vector, is set on the X, Y-axes plane, as shown in FIG. 19, the plurality of directions is set three-dimensionally in a X, Y, Z-axes space in the case of recognizing a three-dimensional moving direction dir. When each of the steps is changed so as to be applicable to a three-dimensional process instead of the two-dimensional process, the moving direction dir and the attitude direction pos can be obtained three-dimensionally in the same manner as the above-described recognition process.

Further, although the above-described plurality of directions, with respect to which acceleration/deceleration is evaluated so as to calculate the above-described deceleration vector, is set as 16 directions on the X, Y-axes plane, as shown in FIG. 19, the number of direction to be set may be less than 16 or, may be 17 or more. In accordance with the number to be set as the plurality of directions, a degree of accuracy and a processing load required for recognizing the direction of the deceleration vector, that is, the direction of the moving direction dir, are changed. Therefore, an appropriate number may be set as the number of plurality of direction in consideration of a balance between a desirable recognition accuracy and a processing load of the moving direction dir.

Further, the above-described deceleration vector is calculated by summing every deceleration magnitude m(n) calculated with respect to each of the plurality of directions on the X, Y-axes plane as shown in FIG. 19. Based on the summing-up processing, the direction of the deceleration vector is represented in an analog manner, without being limited to the plurality of directions having been set, and consequently a most appropriate direction relative to a moving direction of the controller 7 is calculated. Even if a noise is generated in the deceleration magnitude m(n) in any one of the above-described directions, the direction in which the noise is generated will not be misrecognized as the moving direction of the controller 7, and the deceleration vector can be calculated. However, in the case where the above-described effects are not expected, the deceleration vector may be calculated based on another method. For example, in the deceleration magnitude m(n) calculated for each of the plurality of directions, a direction representing a largest deceleration magnitude m(n) may be set as the direction of the deceleration vector, and the value of the largest deceleration magnitude m(n) may be set as the deceleration vector magnitude.

Although the above description describes an example applied to the stationary game apparatus body 5 which executes processes in accordance with an action for changing the direction of the controller 7 or waving the controller 7, in other example embodiments the techniques described may be applied to a hand-held game apparatus. For example, an acceleration sensor is mounted in a body of a hand-held game apparatus, and a predetermined process is executed by using an output by the acceleration sensor when a direction of the body of the hand-held game apparatus is changed or when the body is waved. In this manner, application of certain example embodiments to the hand-held game apparatus, and the like, is ideal when a game is played with the hand-held game apparatus, and the like.

Although the above description describes stationary or hand-held game apparatuses, in other example embodiments an information processing apparatus such as a commonly used personal computer or the like which is operated by an input device including an acceleration sensor or to an information processing apparatus having a body embedding the acceleration sensor. For example, the former information processing apparatus can perform various processes in accordance with the acceleration applied to the input device, such as controlling of a state of a position of an object or a window which is displayed by the information processing apparatus in accordance with acceleration data outputted by the acceleration sensor of the input device. Further, the latter information processing apparatus may be such information processing apparatus that accommodates an acceleration sensor which detects acceleration applied to an body of the information processing apparatus and that executes a processes in accordance with the acceleration data outputted by the acceleration sensor, and is applicable to a device such as a commonly used personal computer, a cellular phone, and a PDA (Personal Digital Assistant), for example.

For example, in the case of a cellular phone which includes a communication section for performing a wireless communication with another telephone, the acceleration sensor is mounted in a body of the cellular phone. When a direction of the cellular phone is changed, or when the cellular phone is waved, a predetermined process is executed based on a value outputted by the acceleration sensor mounted in the cellular phone. In this manner, certain techniques described in accordance with certain example embodiments may be used with the cellular phone when a game is played with the cellular phone.

Further although, in the above description, the controller 7 and the game apparatus body 5 are connected to each other through wireless communication, the controller 7 and the game apparatus body 5 may be electrically connected to each other via a cable. In this case, the cable connected to the controller 7 is connected to a connection terminal of the game apparatus body 5.

The above-described shape of the controller 7, and a shape, the number, a setting position and the like of the operation section 72 included in the controller 7 are merely examples. Needless to say, other embodiments may be realized even when the shape of the controller 7, and the shape, the number, the setting position, and the like of the operation section 72 are different from those described in the embodiment. Further, the coefficients, the determination values, and the like used in the above described processes are merely examples, and it is obvious that other values different from those described in the embodiment can be used.

Further, the information processing program according to certain example embodiments may be provided to the game apparatus body 5 not only through an external storage medium such as the optical disc 4, but also through a wired or wireless communication line. Further, the information processing program may be stored previously in a non-volatile storage device mounted in the game apparatus body 5. An information storage medium for storing the information processing program may be a non-volatile semiconductor memory in addition to a CD-ROM, a DVD, or any other optical disc type storage mediums of the same kind.

The storage medium having the information processing program stored thereon and the information processing apparatus according certain example non-limiting embodiments are capable of quickly reflecting an action of a used into a process, and are useful as a program and an apparatus, respectively, for performing a game process, information processing and the like in accordance with an operation applied to an input device such as a game controller or an operation applied to a body of the information processing apparatus.

While the invention has been described in detail, the foregoing description is in all aspects illustrative and not restrictive. It is understood that numerous other modifications, variations, and/or embodiments can be devised without departing from the scope of the invention.

What is claimed is:

1. A non-transitory storage medium having stored thereon an information processing program configured to be executed by a processing system of an information processing apparatus which is set to receive acceleration data from an acceleration sensor that is configured to detect acceleration applied to a predetermined housing, the information processing program including instructions for a method comprising:
    repeatedly acquiring acceleration data;
    determining whether an acceleration represented by the acceleration data is an acceleration at a time of accelerating, which is applied when the predetermined housing is moved and accelerated in a predetermined direction, or is an acceleration at a time of decelerating, which is applied when the predetermined housing is moved and decelerated in the predetermined direction;
    calculating a moving direction in which the predetermined housing moves by using the determined acceleration at the time of decelerating, the moving direction being calculated independently of the determined acceleration at the time of accelerating; and
    performing a predetermined process by using the moving direction.

2. The storage medium according to claim 1, wherein determining whether an acceleration represented by the acceleration data is an acceleration at the time of accelerating or is an acceleration at a time of decelerating further includes:
    accumulating accelerations applied to a predetermined direction of the predetermined housing as a first value, by using the repeatedly acquired acceleration data;
    accumulating, within a range substantially not exceeding the first value, accelerations applied in a reverse direction of the predetermined direction as a second value by using the repeatedly acquired acceleration data; and
    attenuating the first value and the second value at a predetermined rate,
    wherein the moving direction of the predetermined housing is calculated by using a value based on the second value as the acceleration at the time of decelerating.

3. The storage medium according to claim 2, wherein the predetermined direction is a plurality of directions relative to the predetermined housing and the reverse direction is substantially opposite the predetermined direction, and
    the value based on the second value is obtained by summing the second value for each one of the plurality of directions that is a reverse direction.

4. The storage medium according to claim 2, wherein
    the predetermined direction is a plurality of directions relative to the predetermined housing, and the reverse direction is substantially opposite the predetermined direction, and
    the value based on the second value is obtained by using a maximum value, among values accumulated for each one of the plurality of directions that is a reverse direction.

5. The storage medium according to claim 1, wherein
    the acceleration represented by the acceleration data includes a plurality of acceleration components according to a plurality of directions associated with the predetermined housing, the moving direction is further based on a value which is obtained by summing the plurality of acceleration components at the time of decelerating.

6. The storage medium according to claim 1, wherein
the acceleration represented by the acceleration data includes a plurality of acceleration components applied to a plurality of directions in relation to the predetermined housing,
the moving direction is further calculated from a maximum value among the plurality of acceleration components at the time of decelerating.

7. The storage medium according to claim 1, wherein, when a magnitude of the acceleration at the time of decelerating is larger than a predetermined value, the moving direction is calculated by using the acceleration at the time of decelerating.

8. The storage medium according to claim 7, wherein the method further comprises:
measuring an elapsed time after calculation of the moving direction, and
wherein the predetermined process is performed when the elapsed time reaches a predetermined time.

9. The storage medium according to claim 7, wherein the method further comprises setting the magnitude of the acceleration at the time of decelerating as a latest predetermined value when the magnitude of the acceleration at the time of decelerating becomes larger than the predetermined value.

10. The storage medium according to claim 9, wherein the method further comprises:
decreasing the predetermined value by a predetermined amount when the magnitude of the acceleration at the time of decelerating becomes smaller than the predetermined value.

11. The storage medium according to claim 9, wherein the method further comprises:
setting a fixed value previously, in addition to the predetermined value, and
wherein calculating the moving direction is done when the magnitude of the acceleration at the time of decelerating is larger than both of the predetermined value and the fixed value.

12. The storage medium according to claim 1, wherein the method further comprises:
calculating a deceleration vector, which represents a direction in which the predetermined housing is moving at a decelerated rate, by using the determined acceleration at the time of decelerating, and
wherein calculating a moving direction further includes using the calculated deceleration vector.

13. The storage medium according to claim 12, wherein the method further includes:
accumulating an acceleration applied in a predetermined direction of the predetermined housing from the acquired acceleration data as a first value;
accumulating, within a range not exceeding an accumulated first value, an acceleration applied in a reverse direction of the predetermined direction by using the acquired acceleration data as a second value; and
attenuating the accumulated first and second values respectively each at a predetermined rate,
wherein the calculated deceleration vector is based on the second value.

14. The storage medium according to claim 13, wherein the predetermined direction includes a first plurality of directions relative to the predetermined housing and the reverse direction includes a second plurality of directions, of which each one of the second plurality of directions are respectively substantially opposite each one of the first plurality of directions, and
calculating a deceleration vector further includes summing the second value for each of the second plurality of directions.

15. The storage medium according to claim 13, wherein
the predetermined direction includes a first plurality of directions relative to the predetermined housing and the reverse direction includes a second plurality of directions, of which each one of the second plurality of directions are respectively substantially opposite each one of the first plurality of directions, and
the calculated deceleration vector is based on a maximum value that is selected from the second values of the second plurality of directions, among the second accumulated values.

16. The storage medium according to claim 12, wherein the method further comprises:
calculating a direction of a gravity acceleration applied to the predetermined housing by using the acquired acceleration data, and
the moving direction is based on the direction of the gravity acceleration being applied in accordance with the direction of the calculated gravity acceleration s and a direction represented by the deceleration vector.

17. The storage medium according to claim 12, wherein, when a magnitude of the calculated deceleration vector is larger than a predetermined value, a direction of the deceleration vector is calculated as the moving direction.

18. The storage medium according to claim 17, wherein the method further comprises setting the magnitude of the deceleration vector as a new predetermined value when the magnitude of the calculated deceleration vector becomes larger than the predetermined value.

19. The storage medium according to claim 18, wherein the method further comprises decreasing the predetermined value by a predetermined amount when the magnitude of the calculated deceleration becomes smaller than the predetermined value.

20. The storage medium according to claim 18, wherein the method further comprises:
setting a previously fixed value, in addition to the predetermined value, and
wherein the direction of the deceleration vector as the moving direction is calculated when the magnitude of the calculated deceleration vector is larger than both of the predetermined value and the fixed value.

21. The storage medium according to claim 17, wherein the method further comprises:
measuring an elapsed time after calculation of the moving direction, and
wherein the predetermined process is performed when the elapsed time reaches a predetermined time.

22. The storage medium according to claim 1, wherein, repeatedly acquiring acceleration data includes:
acquiring acceleration data representing an acceleration applied to the predetermined direction of the predetermined housing,
acquiring acceleration data representing an acceleration applied in a reverse direction of the predetermined direction, and
substantially immediately thereafter, determining the acceleration data representing the acceleration applied to the predetermined direction of the predetermined housing as the acceleration at the time of accelerating, and also determining the acceleration data representing the acceleration applied in the reverse direction of the predetermined direction as the acceleration at the time of decelerating.

23. The storage medium according to claim 1, wherein the repeatedly acquired acceleration data is normalized to gravity.

24. An information processing apparatus configured to perform a process by using acceleration data outputted by an acceleration sensor, the acceleration sensor configured to detect an acceleration applied to a predetermined housing, the information processing apparatus comprising:
  a processing system that includes at least one processor, the processing system configured to:
    acquire the acceleration data repeatedly;
    determine whether an acceleration represented by the acceleration data is an acceleration at the time of accelerating, which is applied when the predetermined housing is moved and accelerated in a predetermined direction, or is an acceleration at the time of decelerating, which is applied when the predetermined housing is moved and decelerated in the predetermined direction;
    calculate a moving direction in which the predetermined housing moves by using the determined acceleration at the time of decelerating, the moving direction calculated independently of the determined acceleration at the time of accelerating; and
    perform a predetermined process by using the moving direction.

25. A computer implemented method of determining a movement direction of an acceleration sensor configured to detect accelerations, the acceleration sensor configured to communicate with a processing system, the method comprising:
  receiving data from the acceleration sensor related to the detected accelerations of the acceleration sensor;
  classifying the data as an acceleration when the data indicates that the acceleration sensor has moved and accelerated in a predetermined direction and classifying the data as a deceleration when the data indicates that the acceleration sensor has moved and decelerated in the predetermined direction;
  calculating the movement direction of the acceleration sensor based on the data that is classified as deceleration and independently of data that is classified as acceleration; and
  performing a predetermined process on the processing system by using the calculated movement direction.

26. A system comprising:
  an acceleration sensor disposed in a housing, the acceleration sensor configured to detect accelerations associated with the movement of the housing, the acceleration sensor configured to output data related to accelerations that are detected;
  a processing system configured to communicate with the acceleration sensor, the processing system configured to:
    receive data from the acceleration sensor on the detected accelerations from the acceleration sensor;
    classify the data as acceleration data when the data indicates that the acceleration sensor has moved and accelerated in a predetermined direction;
    classify the data deceleration data when the data indicates that the acceleration sensor has moved and decelerated in the predetermined direction;
    calculate the movement direction of the acceleration sensor based on the classified deceleration data and independently of the classified acceleration data; and
    perform a predetermined process by using the calculated movement direction that is based on the deceleration.

* * * * *